United States Patent
Lee et al.

(10) Patent No.: US 10,775,239 B2
(45) Date of Patent: Sep. 15, 2020

(54) SPECTROMETRIC SENSOR CONTROL METHOD AND ELECTRONIC DEVICE FOR SUPPORTING SAME

(71) Applicant: Samsung Electronics Co., Ltd., Gyeonggi-do (KR)

(72) Inventors: Jaesung Lee, Gyeonggi-do (KR); Minho Park, Gyeonggi-do (KR); Donghyun Lee, Gyeonggi-do (KR); Daehyeong Lim, Gyeonggi-do (KR); Keumsun Choe, Gyeonggi-do (KR); Jongmin Choi, Seoul (KR); Changryong Heo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/211,516

(22) Filed: Dec. 6, 2018

(65) Prior Publication Data

US 2019/0113387 A1   Apr. 18, 2019

Related U.S. Application Data

(63) Continuation of application No. PCT/KR2017/006481, filed on Jun. 20, 2017.

(30) Foreign Application Priority Data

Jun. 21, 2016  (KR) .................. 10-2016-0077492

(51) Int. Cl.
*G01J 3/42* (2006.01)
*G01J 3/10* (2006.01)
(Continued)

(52) U.S. Cl.
CPC ............... *G01J 3/42* (2013.01); *G01J 3/0224* (2013.01); *G01J 3/0232* (2013.01);
(Continued)

(58) Field of Classification Search
CPC ............. G01J 2003/2866; G01J 3/0224; G01J 3/0232; G01J 3/0256; G01J 3/0272;
(Continued)

(56) References Cited

U.S. PATENT DOCUMENTS 10,241,033 B2 * 3/2019 Uematsu .................. G01J 3/02
2006/0114470 A1   6/2006 Takashima et al.
(Continued)

FOREIGN PATENT DOCUMENTS

JP   2016-50804 A   4/2016
JP   2016-70775 A   5/2016
(Continued)

*Primary Examiner* — Hina F Ayub
(74) *Attorney, Agent, or Firm* — Cha & Reiter, LLC

(57) ABSTRACT

According to various embodiments of the present invention, an electronic device can comprise: a light-emitting module for emitting light; a reflection module for reflecting the light emitted from the light-emitting module; a spectrometric module; and a light receiving module for receiving at least one wavelength band among a plurality of wavelength bands dispersed by the spectrometric module.

14 Claims, 22 Drawing Sheets

(51) Int. Cl.
  *G01J 3/02*     (2006.01)
  *G01J 3/28*     (2006.01)
(52) U.S. Cl.
  CPC .......... *G01J 3/0256* (2013.01); *G01J 3/0272* (2013.01); *G01J 3/0291* (2013.01); *G01J 3/0297* (2013.01); *G01J 3/10* (2013.01); *G01J 3/28* (2013.01); *G01J 2003/2866* (2013.01)
(58) Field of Classification Search
  CPC .......... G01J 3/0291; G01J 3/0297; G01J 3/10; G01J 3/28; G01J 3/42
  See application file for complete search history.

(56)         References Cited

U.S. PATENT DOCUMENTS

| | | | |
|---|---|---|---|
| 2006/0234386 A1 | 10/2006 | Burns et al. | |
| 2011/0216315 A1 | 9/2011 | Uematsu et al. | |
| 2013/0003064 A1* | 1/2013 | Allen | G01J 3/28 356/402 |
| 2017/0153142 A1* | 6/2017 | Rosen | G01J 3/0275 |
| 2018/0143073 A1* | 5/2018 | Goldring | G01J 3/0291 |
| 2018/0149519 A1* | 5/2018 | Connor | G01J 3/0264 |
| 2018/0224330 A1* | 8/2018 | Yokino | G01J 3/0264 |

FOREIGN PATENT DOCUMENTS

| | | |
|---|---|---|
| KR | 10-2006-0060574 A | 6/2006 |
| KR | 10-2011-0101054 A | 9/2011 |
| KR | 10-2012-0077211 A | 7/2012 |

* cited by examiner

SPECTROMETRIC SENSOR CONTROL METHOD AND ELECTRONIC DEVICE FOR SUPPORTING SAME

CROSS REFERENCE TO RELATED APPLICATIONS

The present application is a Continuation PCT/KR2017/006481, which was filed on Jun. 20, 2017, and claims priority to Korean Patent Application No. 10-2016-0077492 which was filed on Jun. 21, 2016, the contents of which are incorporated herein by reference.

TECHNICAL FIELD

Various embodiments of the present invention relate to a method of controlling a spectrometer and an electronic device supporting the same, and more particularly, to a method of correcting a deviation of a light source of a spectrometer.

BACKGROUND ART

Nowadays, with the development of digital technology, various electronic devices capable of processing communication and personal information while moving, such as a mobile communication terminal, personal digital assistant (PDA), electronic organizer, smart phone, and tablet personal computer (PC), have been released.

The electronic device may obtain data regarding a medical field beyond a communication device. By having a spectrometer in the electronic device, the electronic device may measure medical field data such as a heart rate using the spectrometer.

The spectrometer is a sensor capable of analyzing a material through a spectrum of reflection scattering light obtained by radiating light to a target material (e.g., a portion of a user's body). The spectrometer may include a light source, and the light source may radiate light to a surface of a standard reflective material and designate intensity of reflected light to reference white. The spectrometer may obtain a reflection or absorption spectrum through a reflection scattering light intensity ratio of the target material based on the reference white.

DISCLOSURE OF INVENTION

Technical Problem

In a light source used in the spectrometer, because a natural spectrum may be changed according to a surrounding environment and a use time, by measuring a natural spectrum value of a light source using a standard reflective material for a predetermined period or every measurement for accurate spectroscopic analysis, a reference white value should be corrected. However, for accurate analysis using the spectrometer, a user should separately carry a standard reflective material in daily life, and inconvenience may occur in the case that the user should directly perform a correction operation.

According to various embodiments of the present invention, in an electronic device including a spectrometer, the inconvenience of a user in carrying a separate standard reflective material or performing periodically direct correction can be removed and, by automatically performing correction, an accurate spectrum result value can be obtained.

Solution to Problem

In accordance with an aspect of the present invention, an electronic device includes a light emitting module configured to emit light, a reflection module configured to reflect light emitted from the light emitting module, a spectroscopic module configured to receive light reflected from the reflection module to distribute the light into a plurality of wavelength bands, and a light receiving module configured to receive at least one wavelength band of a plurality of wavelength bands distributed by the spectroscopic module.

Advantageous Effects of Invention

In an electronic device and method according to various embodiments of the present invention, in an electronic device including a spectrometer, by correcting a light source deviation of the spectrometer using a reflection module including a layer coated with a standard reflective material, the inconvenience of a user carrying a standard reflective material can be reduced and user convenience can be improved by automatically correcting a light source deviation of the spectrometer using the reflection module.

MODE FOR THE INVENTION

Figure 1:
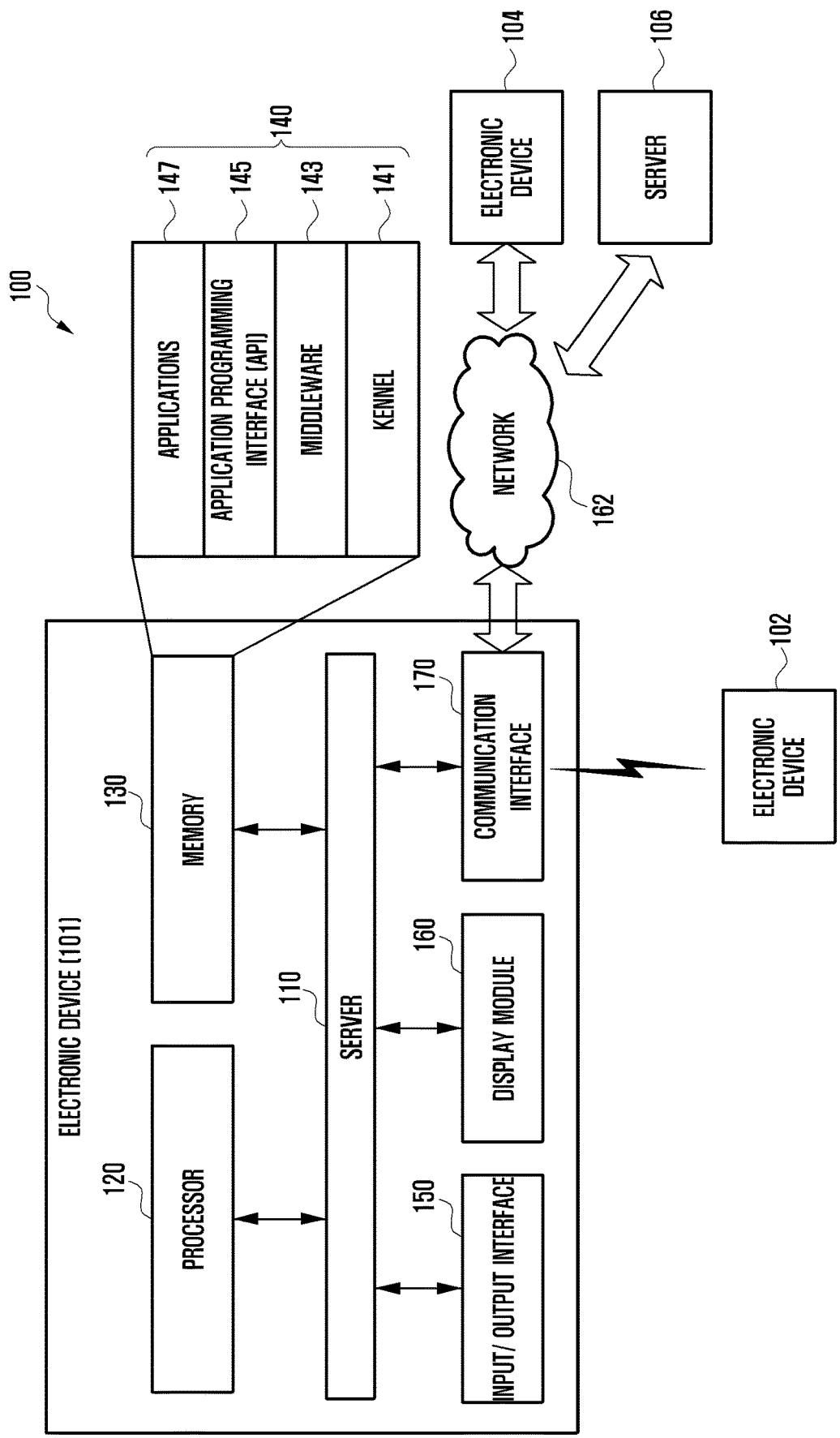
FIG. 1 is a block diagram illustrating a configuration of an electronic device in a network environment according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

The expressions such as "include" and "may include" may denote the presence of the disclosed functions, operations, and constituent elements and do not limit one or more additional functions, operations, and constituent elements. Terms such as "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

The expression "configured to" uses in the present disclosure may be replaced, according to situations, with "suitable for". "having the capacity to", "designed to", "adapted to", "made to", or "capable of". The term "configured to" may not always mean "specially designed to". In some situations, "device configured to" may mean that the device can "do something" with other devices or components. For example, a context "processor configured to execute A, B, and C" may mean a dedicated processor (for example, embedded processor) for executing a corresponding operation, or a generic-purpose processor (for example, central processing unit (CPU) or application processor (AP)) capable of executing corresponding operations by using at least one software program stored in a memory device.

The terms used in the present disclosure are to merely describe a specific embodiment and are not intended to limit the scope of other embodiments. A singular form may include a plural form. All the terms including a technical or scientific term may have the same meaning as terms generally understood by those skilled in the prior art. The terms defined in a general dictionary may be interpreted as having the same or similar meaning in a context of related technology and are not interpreted abnormally or excessively unless clearly defined in the present disclosure. According to situations, the terms defined in the present disclosure cannot be interpreted as excluding the embodiments of the present disclosure.

An electronic device according to various embodiments of the present disclosure may be a device including a projection function. For example, the electronic device may be one or a combination of a smart phone, a tablet personal computer (PC), a mobile phone, a video phone, an e-book reader, a desktop PC, a laptop PC, a netbook computer, a personal digital assistant (PDA), a camera, a wearable device. The wearable device according to various embodiments of the present disclosure may include at least one of electronic glasses, electronic clothes, and electronic bracelet, an electronic necklace, a head-mounted-device (HMD), an electronic appcessary, an electronic tattoo, and a smart watch.

According to some embodiments, the electronic device may be a smart home appliance having a projection function. The smart home appliance may include at least one of a television (TV), a digital video disk (DVD) player, an audio player, an air conditioner, a cleaner, an oven, a microwave oven, a washing machine, an air cleaner, a set-top box, a TV box (for example, SAMSUNG HOMESYNC™, APPLE TV™, or GOOGLE TV™), game consoles, an electronic dictionary, an electronic key, a camcorder, and an electronic frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure. An electronic device 101 within a network environment 100, according to various embodiments, will be described with reference to FIG. 1. The electronic device 101 may include a bus 110, a processor 120, a memory 130, an input/output interface 150, a display 160, and a communication interface 170. According to an embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include one or more of a Central Processing Unit (CPU), an Application Processor (AP), and a Communication Processor (CP). The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short-range communication 164 may include at least one of, for example, Wi-Fi, Bluetooth, Near Field Communication (NFC), MST (magnetic stripe transmission) and Global Navigation Satellite System (GNSS).

MST may generate a pulse according to transmission data using an electromagnetic signal, and the pulse may generate a magnetic field signal. The electronic device 101 may transmit the magnetic field signal to a point of sales (POS), and the POS may detect the magnetic field signal using an MST reader and convert the detected magnetic field signal to an electrical signal, thereby restoring the data.

GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
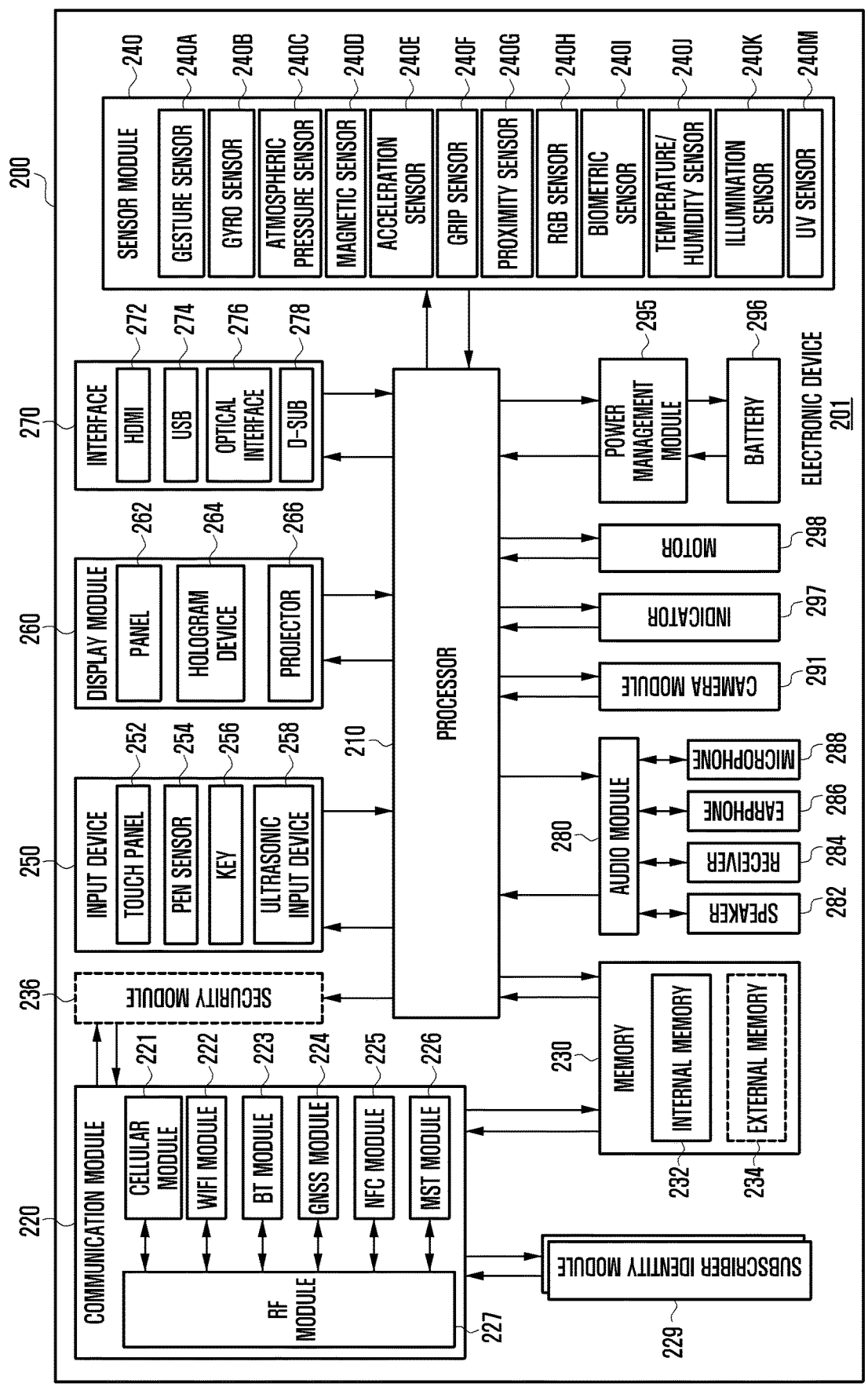
FIG. 2 is a block diagram illustrating a configuration of an electronic device according to various embodiments.

FIG. 2 is a block diagram of an electronic device according to various embodiments of the present disclosure. The electronic device 201 may include, for example, all or a part of the electronic device 101 shown in FIG. 1. The electronic device 201 may include one or more processors 210 (e.g., Application Processors (AP)), a communication module 220, a Subscriber Identification Module (SIM) 229, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include, for example, a cellular module 221, a Wi-Fi module 222, a BT module 223, a GNSS module 224 (e.g., a GPS module, a Glonass module, a Beidou module, or a Galileo module), an NFC module 225, a MST module 226 and a Radio Frequency (RF) module 227.

The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 222, the BT module 223, the GNSS module 224, the NFC module 225 and the MST module 226 may include a processor for processing data transmitted/received through a corresponding module. According to an embodiment of the present disclosure, at least some (e.g., two or more) of the cellular module 221, the Wi-Fi module 222, the BT module 223, the GNSS module 224, the NFC module 225 and the MST module 226 may be included in one Integrated Chip (IC) or IC package.

The RF module 227, for example, may transmit/receive a communication signal (e.g., an RF signal). The RF module 227 may include, for example, a transceiver, a Power Amplifier Module (PAM), a frequency filter, a Low Noise Amplifier (LNA), and an antenna. According to another embodiment of the present disclosure, at least one of the cellular module 221, the Wi-Fi module 222, the BT module 223, the GNSS module 224, the NFC module 225 and the MST module 226 may transmit/receive an RF signal through a separate RF module.

The subscriber identification module 229 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The security module 236 may be a module including a storage space having a relatively higher security level than the memory 230, and may be a circuit that ensures safe data storage and a protected execution environment. The security module 236 may be implemented as a separate circuit and may include a separate processor. The security module 236 may include an embedded secure element (eSE) embedded in, for example, a removable smart chip, a secure digital (SD) card, or embedded secure element (eSE) within a fixed chip of the electronic device 201. In addition, the security module 236 may be operated with an operating system different from the operating system (OS) of the electronic device 201. For example, it can operate on a Java card open platform (JCOP) operating system.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
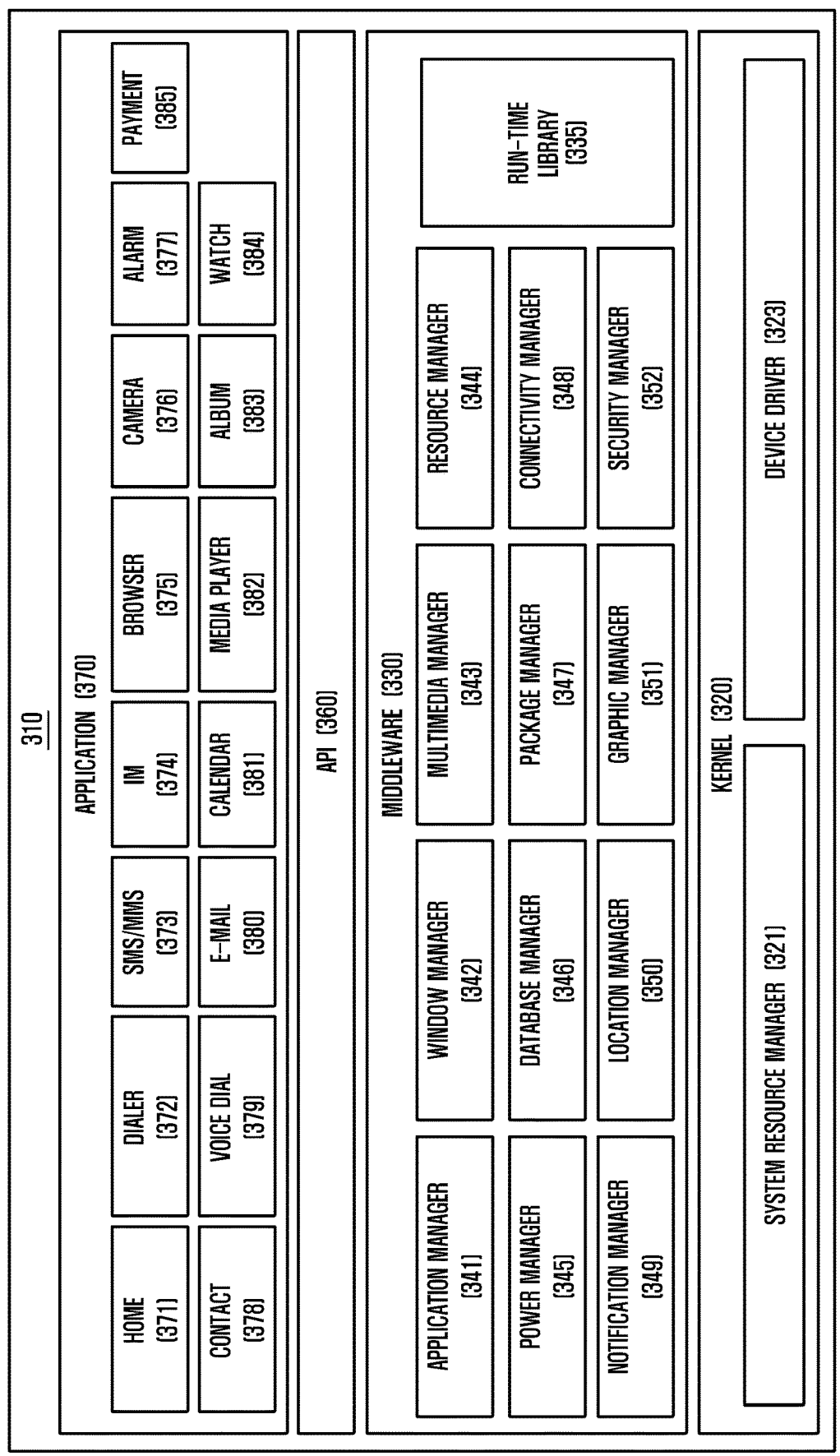
FIG. 3 is a block diagram illustrating a configuration of a program module according to various embodiments.

FIG. 3 is a block diagram of a program module according to various embodiments of the present disclosure. According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android, iOS, Windows, Symbian, Tizen, Bada, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android or iOS, one API set may be provided for each platform. In the case of Tizen™, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information).

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 1410). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

A method of controlling a spectrometer (or spectrometric sensor) according to various embodiments of the present invention and an electronic device supporting the same will be described in detail with reference to FIGS. 4 to 13

Figure 4A:
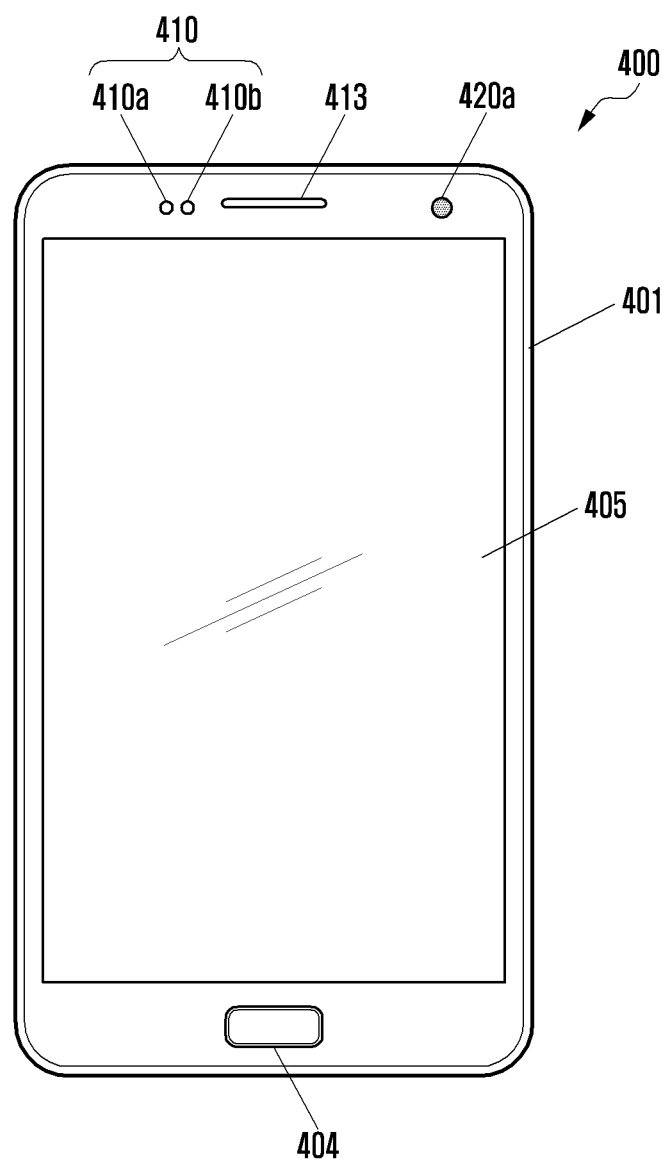
FIGS. 4A and 4B are diagrams illustrating an electronic device according to various embodiments.
Figure 4B:
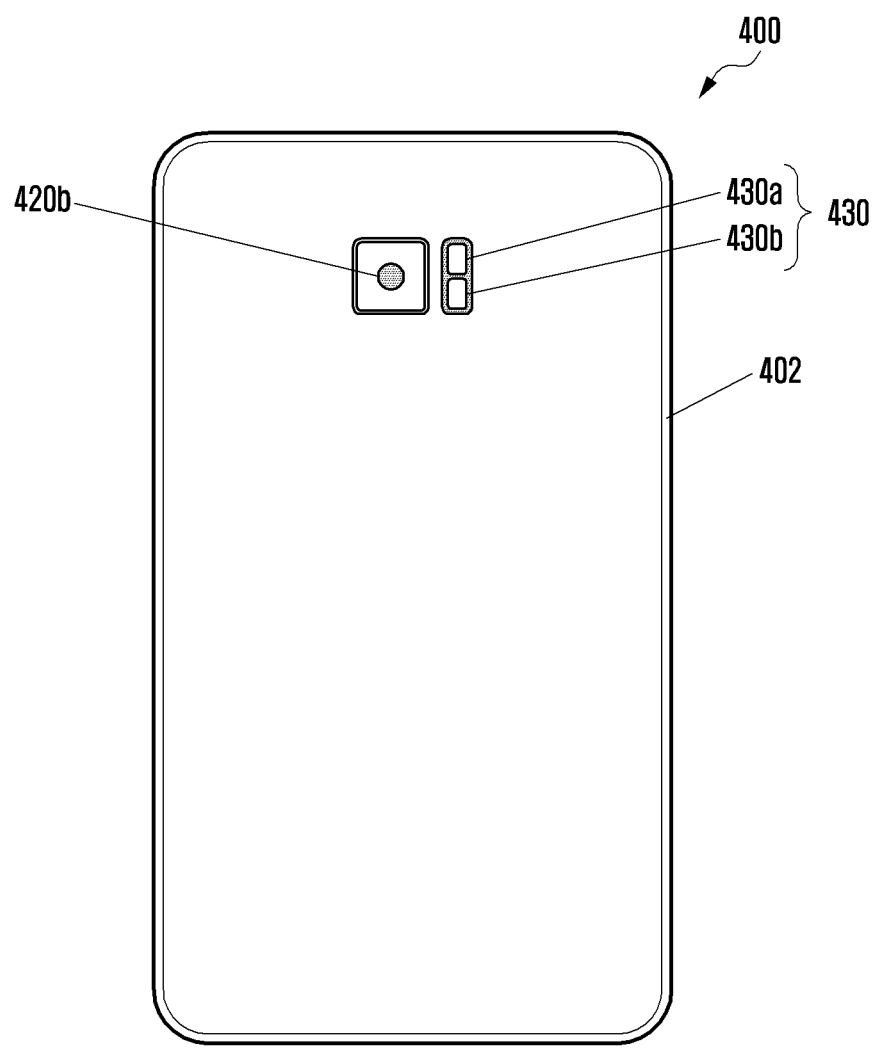

FIGS. 4A and 4B are diagrams illustrating an electronic device according to various embodiments.

With reference to FIGS. 4A and 4B, an electronic device 400 may include various electronic components and a housing for protecting the electronic components. The housing may include a first housing 401 in a first direction; a second housing 402 facing in a second direction substantially opposite to the first direction; and a side member enclosing at least a portion of a space between the first housing 401 and the second housing 402. For example, the first housing 401 may be a cover forming a front surface of the electronic device 400, and a display 405 (e.g., 160 of FIG. 1) may be positioned at a portion of the cover. For example, the second housing 402 may be a cover forming a rear surface of the electronic device 400.

With reference to FIG. 4A, at least one of a light emitting module 410a and a light receiving module 410b of a spectrometer 410 (or spectrometric sensor), a speaker 413, and a front camera 420a may be positioned in at least a partial area of the first housing 401. Further, the first housing 401 may include a physical home button.

With reference to FIG. 4B, at least one of a light emitting module 430a and a light receiving module 430b of a spectrometer 430 and a rear camera 420b may be positioned in at least a partial area of the second housing 420. The spectrometer 430 may be included in the display module 260 of FIG. 2.

The light emitting modules 410a and 430a and the light receiving modules 410b and 430b of the spectrometers 410 and 430 may be variously disposed in the electronic device 400 according to usability or a product structure.

Figure 5A:
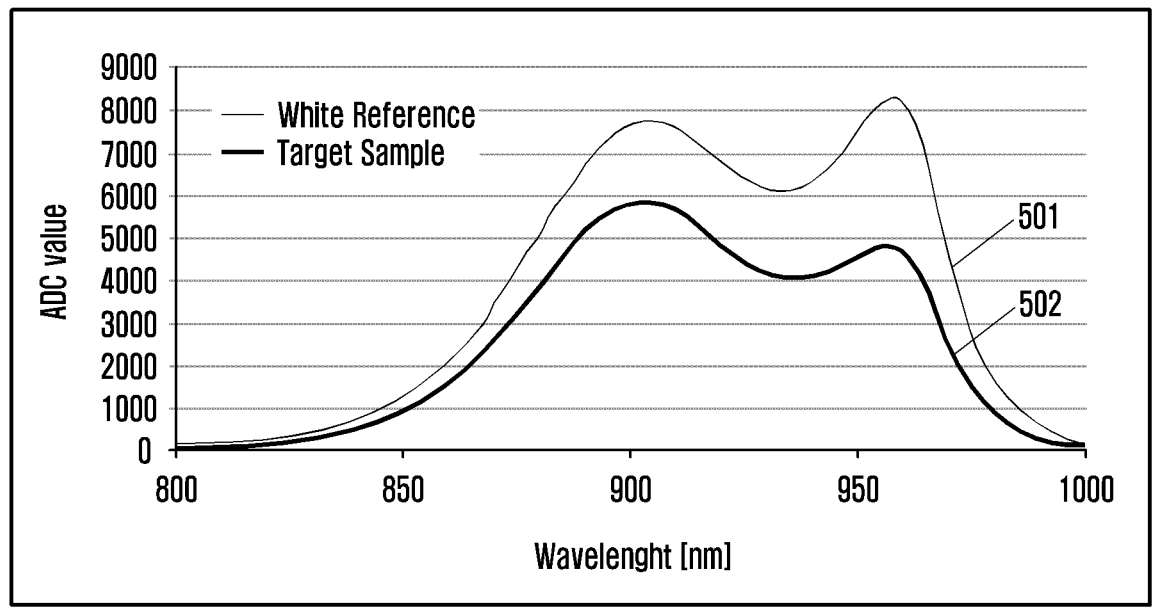
FIGS. 5A and 5B are graphs illustrating a reflectance of a target material according to various embodiments.
Figure 5B:
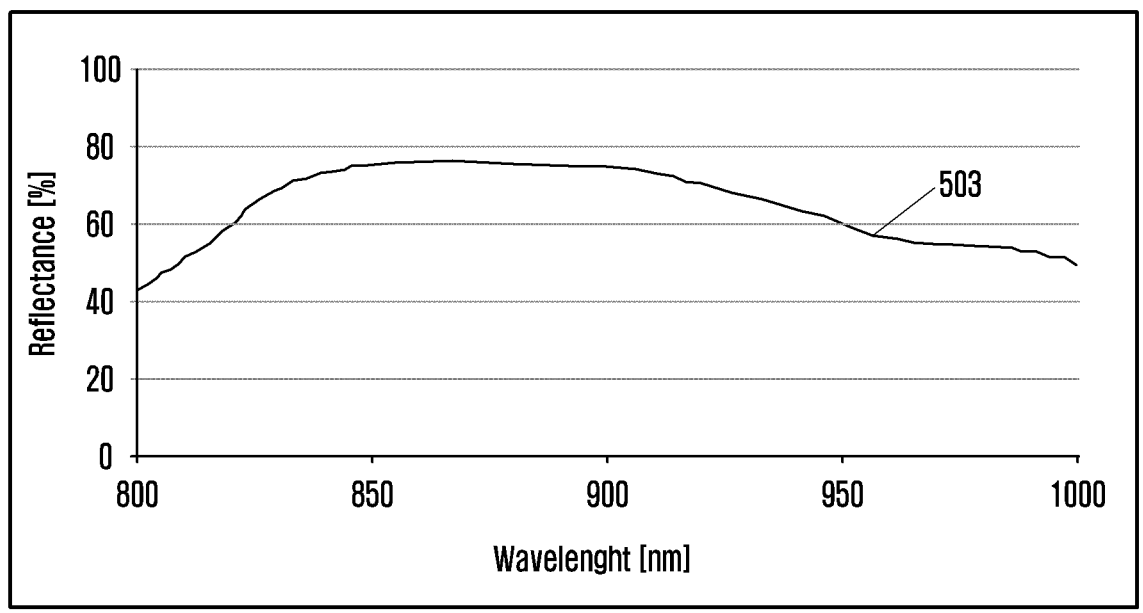

FIGS. 5A and 5B are graphs illustrating reflectance of a target material according to various embodiments.

With reference to FIG. 5A, the electronic device may radiate light to each of a target material and a standard reflective material to obtain reflection data of each material. FIG. 5A is a graph illustrating reflection data reflected and obtained from each material. In FIG. 5A, a graph 501 is a graph illustrating reflection data of a standard reflective material, and the reflection data of the standard reflective material may be obtained by the light receiving module by reflecting light emitted from a light source, which is a light emitting module from the standard reflective material.

A graph 502 of FIG. 5A is a graph illustrating reflection data of a random target material for analysis, and the reflection data of the target material may be obtained by the light receiving module by reflecting light emitted from a light source, which is a light emitting module from the target material. The reflection data of the standard reflective material may be reference data for measuring a target material, and the reference data may be reference white. The standard reflective material may be a porous material and may have a property that reflects light.

With reference to FIG. 5B, a graph 503 of FIG. 5B may be obtained by dividing reflection data of a random target material for the above-mentioned analysis by the reference data. By dividing the reflection data of the target material for analysis by the reference data, an inherent light reflectance of the target material may be known.

Because each material has different reflection (or absorption) ratios of light according to a wavelength, in order to know at least some properties of each material, light reflection ratios should be known. In order to know light reflection ratios, reference data are required, and accuracy of the reference data should be ensured. Because a condition (e.g., a natural spectrum) of the light source of the spectrometer included in the electronic device may be changed according to a temperature, humidity, and frequency of use, before performing spectroscopic analysis of the target material, the spectrometer should be able to perform an operation for correcting reference data (e.g., reference white).

FIGS. 6A to 6D are diagrams illustrating a structure for correcting a spectrometer of an electronic device according to various embodiments.

With reference to FIGS. 6A to 6D, the spectrometer may include a reflection module, spectroscopic module, light emitting module, and light receiving module.

The reflection module may include a reflective material layer, and the reflective material layer may include a layer 602 coated with a standard reflective material. The layer 602 coated with a standard reflective material may be positioned at one surface of one of a first substrate 601 and a second substrate 609.

The first substrate 601 may be a substrate that can enable measurement and correction operations of a spectrometer to be performed by transmitting or reflecting light generated in a light source, which is a light emitting module 607

The layer 602 coated with a standard reflective material may be disposed at a front surface of the light emitting module 607 and a light receiving module 606. The layer 602 coated with a standard reflective material may be a layer coated with polytetrafluoroethylene (hereinafter, PTFE). PTFE is a material having a reflectance of 95-99% in a range of 450-25800 nm and may be used as reference white for determining a spectrum of a light source itself.

Glass 603 may be positioned on an external wall 604a and an isolation wall 604b. The glass 603 may transmit light generated in the light emitting module 607 and/or light reflected by the layer 602 coated with a standard reflective material.

The light emitting module (emitter) 607 may generate light including a spectrum, i.e., a wavelength band to obtain reflection data. The light emitting module 607 may include a light source.

The light receiving module (detector) 606 may measure intensity of distributed light and may be a device for converting an amount of incident photons to a current and enabling the current to be measured. The light receiving module 606 may include, for example, a photodiode and a pyroelectric detector.

A spectroscopic module 605 may distribute light generated in the light emitting module 607, i.e., the light source to enable analysis of the light on a wavelength basis before the light reaches the light receiving module 606 through various paths. For example, the spectroscopic module 605 may include a long pass filter, short pass filter, band pass filter, notch filter, diffraction grating device, Fabry-Perot interferometer, linear variable filter (LVF), and digital light processor (DLP). Further, the spectroscopic module 605 may further include a reflection plate and a lens for adjusting a path and shape of light. The spectroscopic module 605 may be disposed on the light receiving module 606. According to another embodiment, the spectroscopic module 605 may be disposed on the light emitting module 607. Alternatively, when the light emitting module 607 includes a light source for generating short wavelength light, the spectroscopic module 605 may be omitted.

A structure for correcting a spectrometer may further include an application specific integrated circuit (ASIC) 608. The ASIC 608 may include a light emitting diode (LED) driver integrated circuit (IC) for controlling the light emitting module 607, i.e., a light source; an oscilloscope (OSC) for controlling a micro controller unit (MCU) (e.g., the processor 120 of FIG. 1) and the light receiving module 606; and an analog circuit chipset (e.g., analog front-end (AFE)).

The outer wall 604a and the isolation wall 604b may be a structure for preventing light generated in the light emitting module 607, i.e., a light source, from being directly introduced into the light receiving module 606. The outer wall 604a and the isolation wall 604b may enable light generated in the light emitting module 607 to reach and reflect the layer 602 coated with the standard reflective material and to enter the light into the light receiving module 606.

Figure 6A:
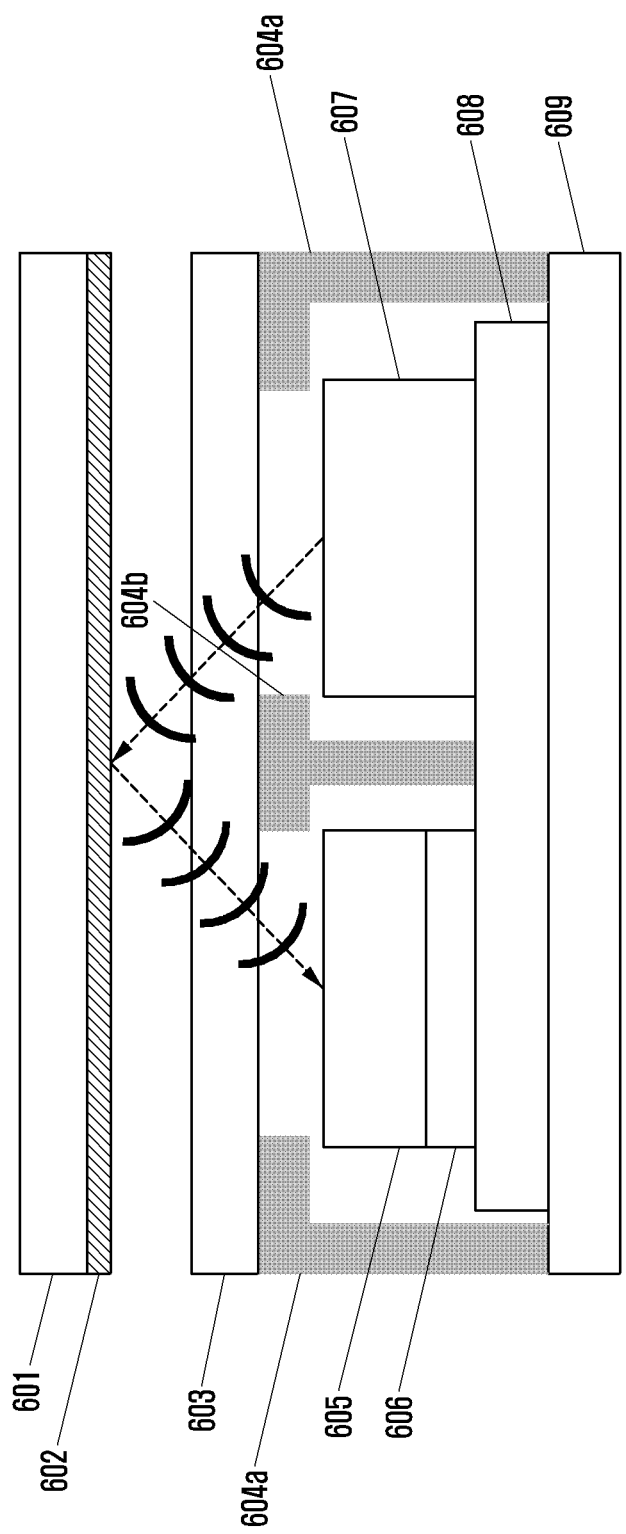
FIGS. 6A to 6D are diagrams illustrating a structure for correcting a spectrometer of an electronic device according to various embodiments.

In an embodiment, with reference to a structure of FIG. 6A, in the reflection module, the layer 602 coated with a standard reflective material may come in close contact with one surface of one substrate 601 and be spaced apart by a predetermined distance from a front surface of the spectrometer.

Figure 6B:
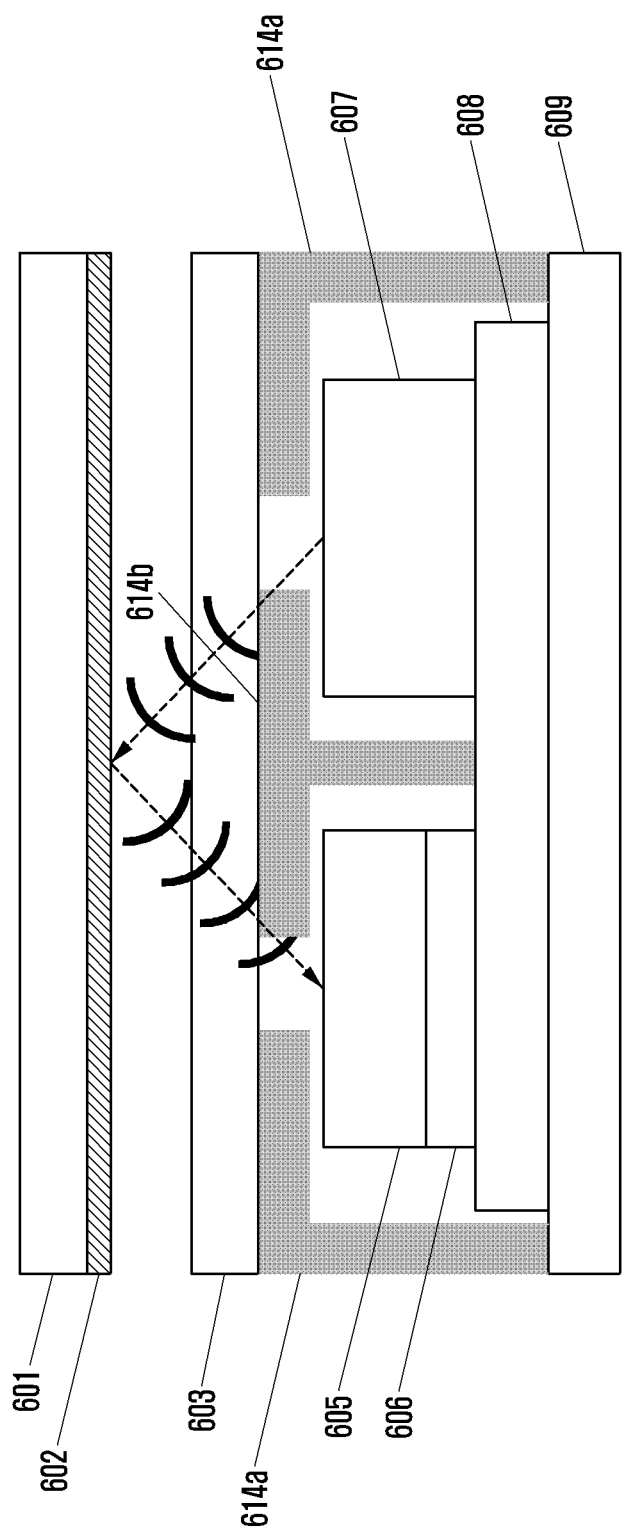

In another embodiment, with reference to a structure of FIG. 6B, in the reflection module, a layer 602 coated with a standard reflective material may come in close contact with one surface of one substrate 601 and be spaced apart by a predetermined distance from a front surface of the spectrometer. Further, in the reflection module, an external wall 614a and an isolation wall 614b may have a shape expanded to cover a portion of a light receiving module 606 and a light emitting module 607 in order to effectively prevent light generated in the light emitting module 607 from being directly introduced into the light receiving module 606.

Figure 6C:
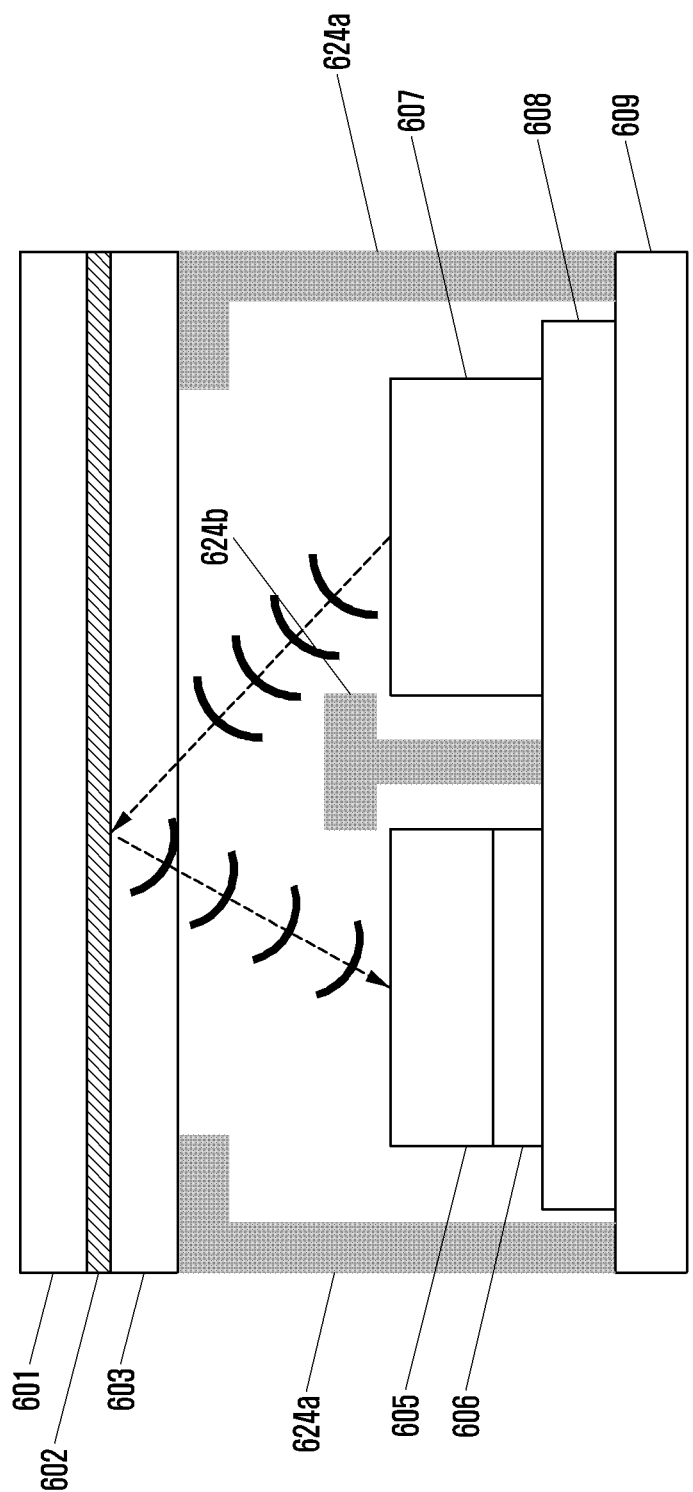

In another embodiment, with reference to a structure of FIG. 6C, in the reflection module, a layer 602 coated with a standard reflective material may come in close contact with one surface of one substrate 601, and the layer 602 coated with a standard reflective material and the substrate 601 may come in close contact with glass 603 disposed on the spectrometer. The isolation wall 624b may have a lower height than that of an outer wall 624a in order to secure a space for enabling light emitted from a light emitting module 607 to reach a light receiving module 606 by reflection. The isolation wall 624b having a lower height than that of the outer wall 624a may not come in close contact with the glass 603.

Figure 6D:
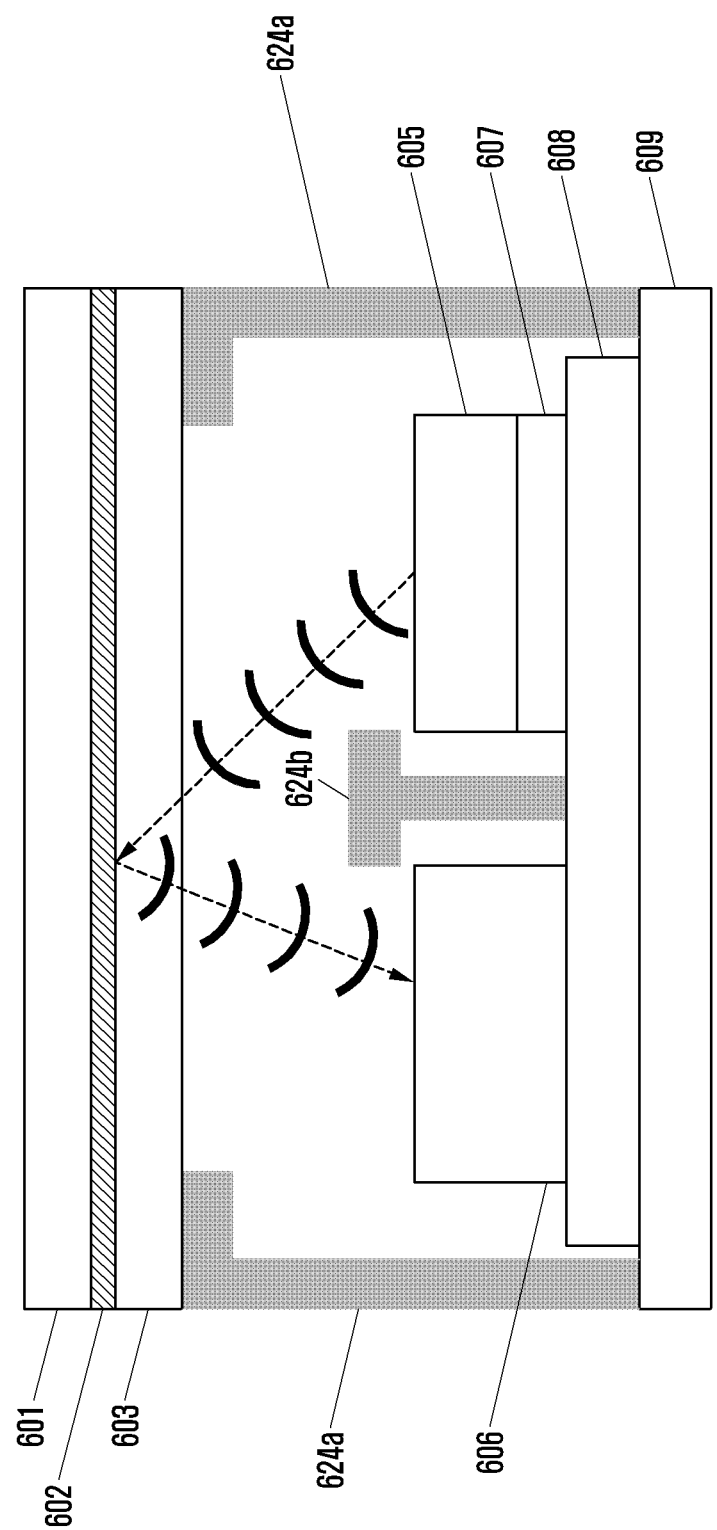

In another embodiment, with reference to a structure of FIG. 6D, a layer 602 coated with the standard reflective material of the reflection module may come in close contact with one surface of one substrate 601, and the layer 602 coated with a standard reflective material and the substrate 601 may come in close contact with glass 603 disposed on the spectrometer. An isolation wall 624b may have a lower height than that of an outer wall 624a in order to secure a space for enabling light emitted from a light emitting module 607 to reach a light receiving module 606 by reflection. The isolation wall 624b having a lower height than that of the outer wall 624a may not come in close contact with the glass 603. Further, a spectroscopic module 605 may be disposed on the light emitting module 607. In the foregoing description described with reference to FIGS. 6A and 6B, the spectroscopic module 607 may be disposed on the light receiving module 606.

Figure 7A:
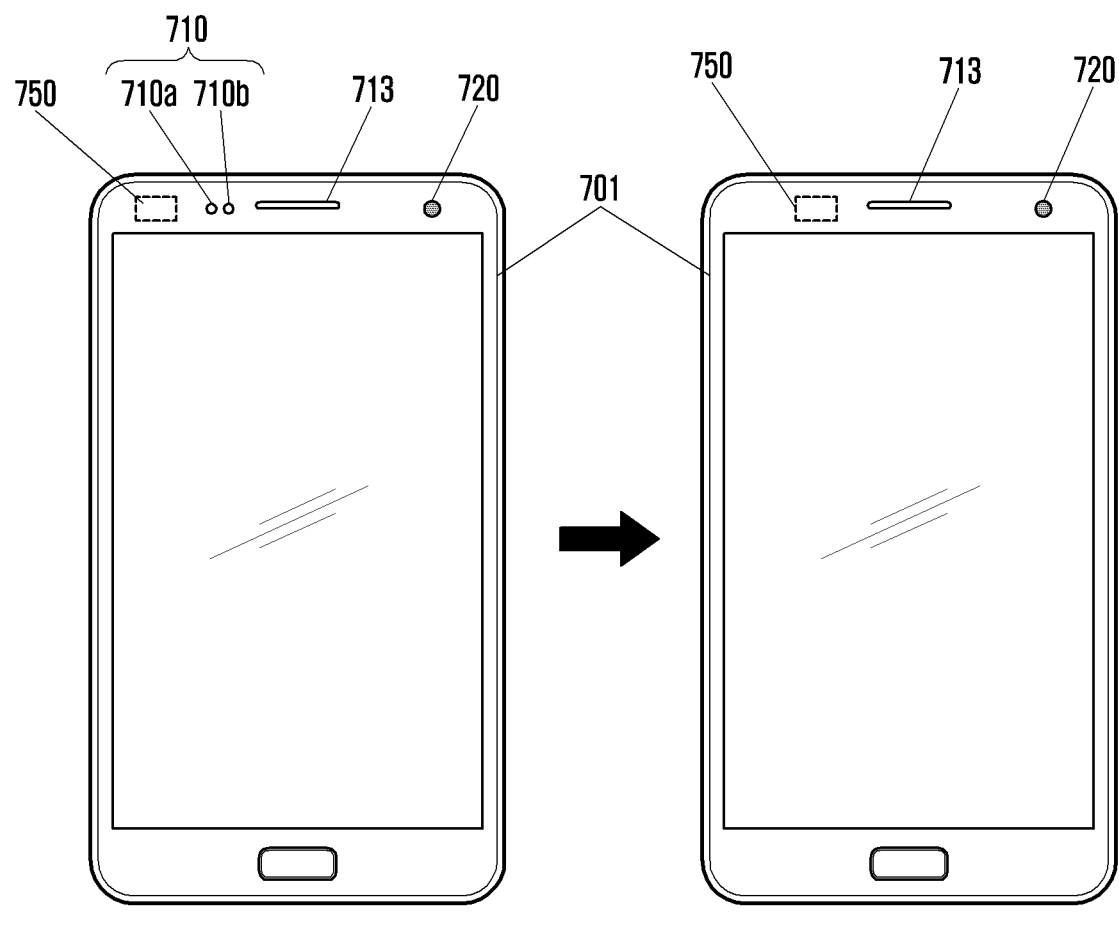
FIG. 7A is a diagram illustrating an electronic device according to various embodiments.
Figure 7B:
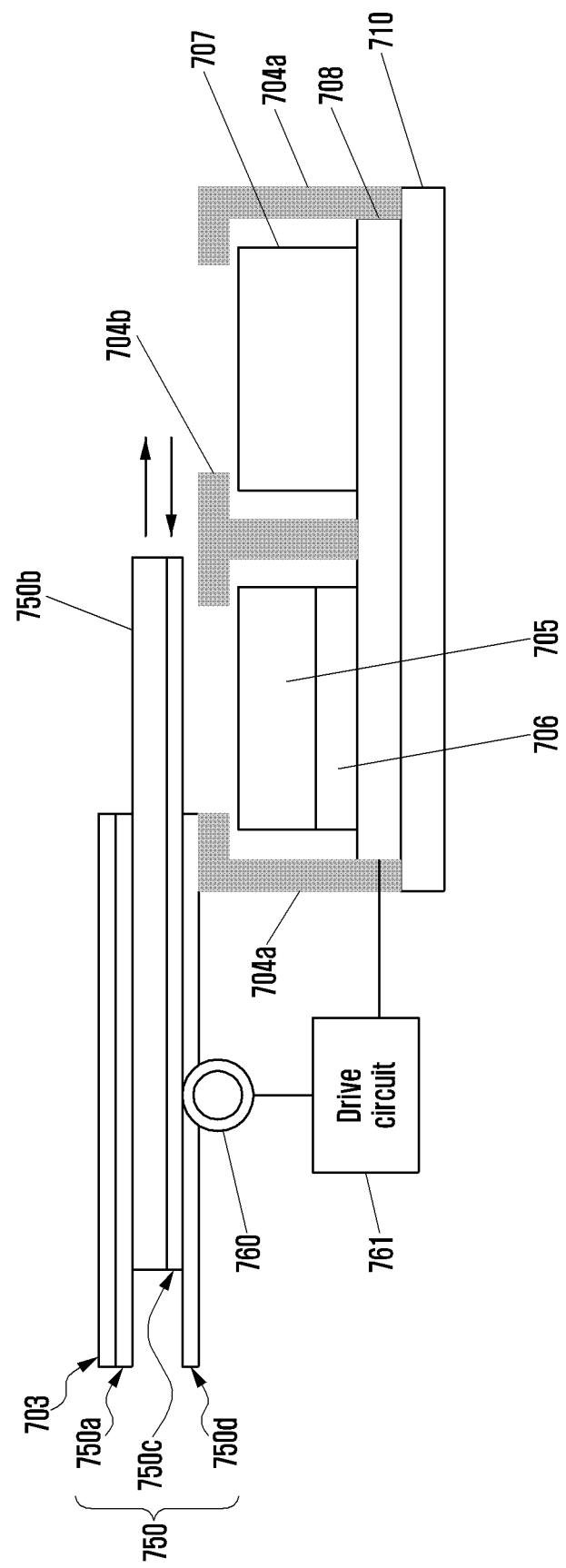
FIG. 7B is a diagram illustrating a detailed structure for correcting a spectrometer of the electronic device of FIG. 7A.

FIG. 7A is a diagram illustrating an electronic device according to various embodiments. FIG. 7B is a diagram illustrating a detailed structure for correcting a spectrometer of the electronic device of FIG. 7A.

With reference to FIG. 7A, a housing 701 (e.g., the first housing 401 of FIG. 4A) of the electronic device may be a cover forming a front surface of the electronic device, and a display may be positioned at a portion thereof. Through the housing 701 of at least a portion of the electronic device, a light emitting module 710a, light receiving module 710b, speaker 713, and front camera 720 may be positioned. The housing 701 of at least a portion of the electronic device may include an opening and closing portion 750 for opening and closing the light emitting module 710a or the light receiving module 710b from the outside at a position close to a spectrometer 710.

With reference to reference numeral 780, the opening and closing portion 750 may be provided inside at least a portion of the housing 701. With reference to reference numeral 790, while a blade of the opening and closing portion 750 is mechanically closed, the blade may cover the light emitting module 710a or the light receiving module 710b from the outside. At an inner side surface of the blade 750, i.e., one surface facing the light emitting module 710a or the light receiving module 710b, a standard reflective material may be coated or a layer coated with a standard reflective material may be provided.

FIG. 7B schematically illustrates a structure of the opening and closing portion 750 of FIG. 7A. The opening and closing portion 750 of the electronic device may be disposed adjacent to the spectrometer of the electronic device.

The opening and closing portion 750 may include a blade 750b, a layer 750c coated with a standard reflective material that comes in close contact with one surface of the blade 750b, and a upper plate support 750a and lower plate support 750d that fix the blade 750b and that guide a movement of the blade 750b.

The electronic device may include glass 703, and the glass 703 may fix the blade 750b and be mounted at the upper end of the upper plate support 750a or the lower end of the lower plate support 750d. The glass 703 may be positioned at the upper end of at least one of a light emitting module 707 and a light receiving module 706. In an embodiment, FIG. 7B illustrates the glass 703 mounted at the upper end of the upper plate support 750a.

Upon correcting a natural spectrum of the light source, the electronic device may enable an ASIC 708 to control a drive circuit 761 to drive the motor, thereby closing the opening and closing portion 750 to cover the light emitting module 707 or the light receiving module 706. A motor 760 may include a rolling motor and an autofocus (AF) motor.

Figure 8A:
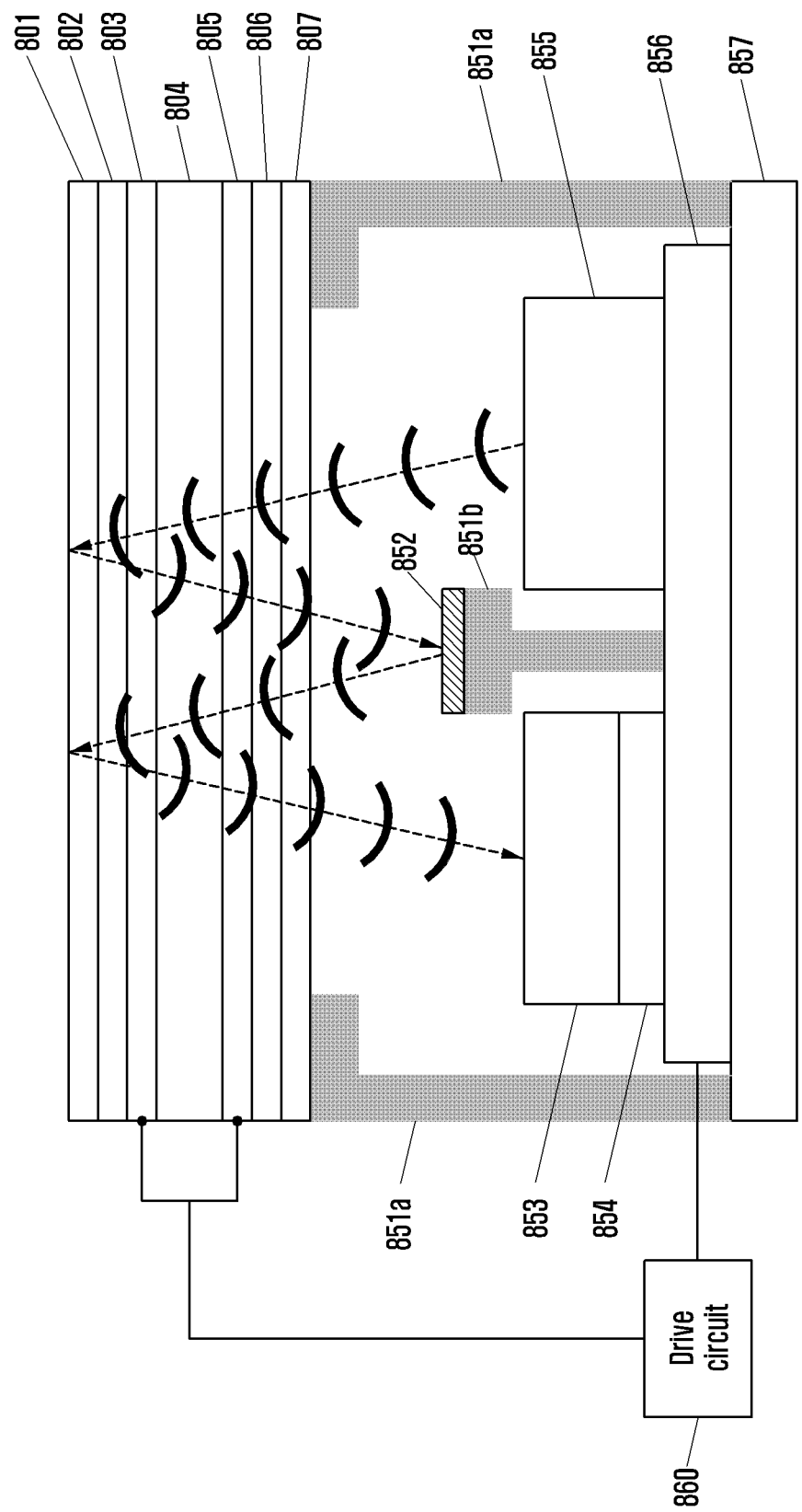
FIG. 8A is a diagram illustrating a structure for correcting a spectrometer of an electronic device according to various embodiments.
Figure 8B:
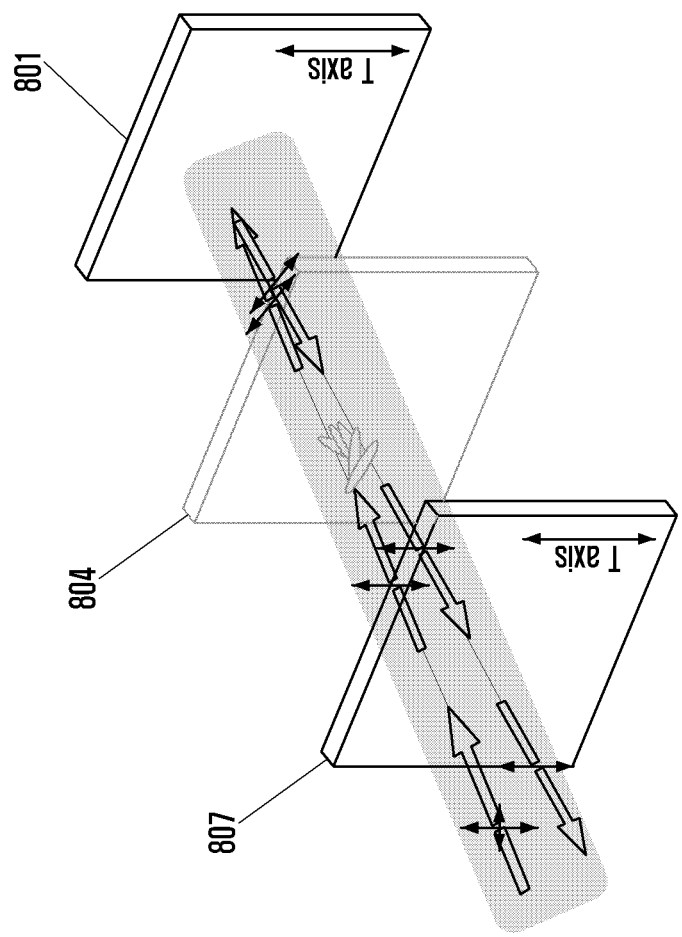
FIG. 8B is a diagram illustrating correction of a spectrometer through the structure of FIG. 8A.
Figure 8C:
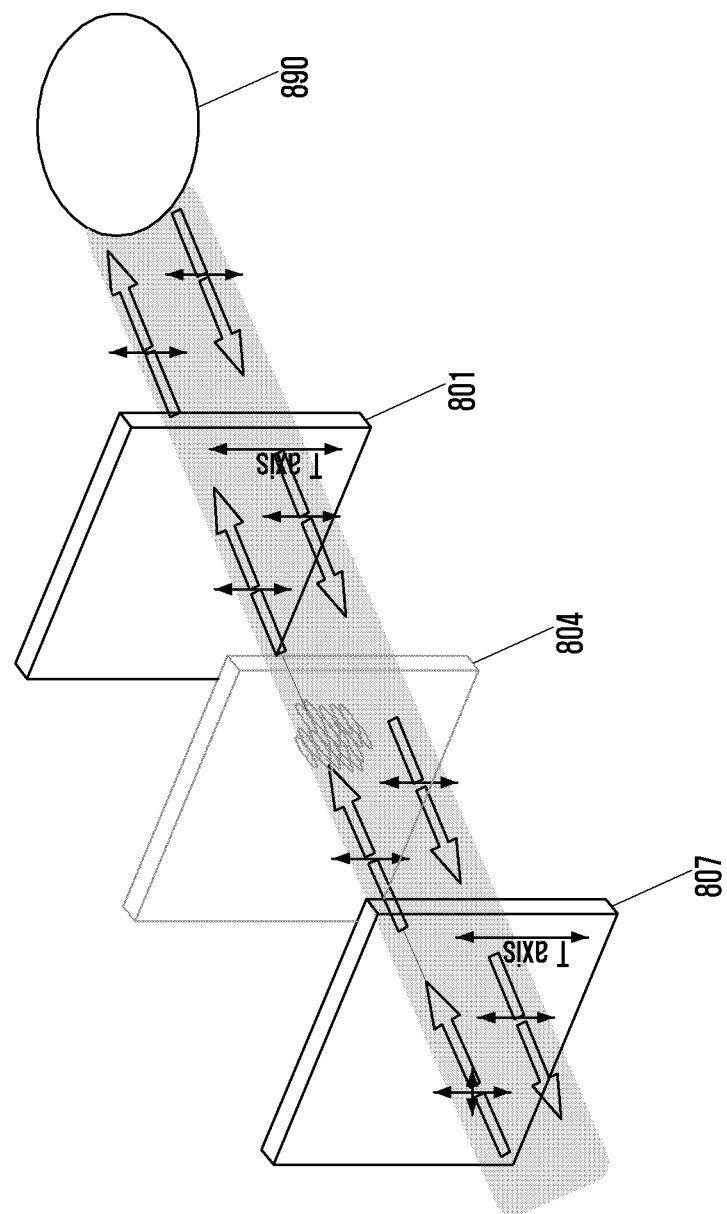
FIG. 8C is a diagram illustrating measurement of a target material through the structure of FIG. 8A.

FIG. 8A is a diagram illustrating a structure for correcting a spectrometer of an electronic device according to various embodiments. FIG. 8B is a diagram illustrating correction of a spectrometer through the structure of FIG. 8A. FIG. 8C is a diagram illustrating measurement of a target material through the structure of FIG. 8A.

With reference to FIG. 8A, the electronic device may include a reflection module, spectroscopic module, light emitting module, and light receiving module positioned on a substrate 857. The electronic device may include a display panel layer on the modules. The display panel layer may include a reflective polarizing plate 801, first glass 802, first transparent electrode 803, liquid crystal layer 804, second transparent electrode 805, second glass 806, and polarizing plate 807. The panel layer may be in a close contact (or attached) form.

A light emitting module (emitter) 855 may generate light including a spectrum, i.e., a wavelength band, to obtain reflection data. The light emitting module 855 may include a light source. A light receiving module (detector) 854 may be a device for measuring intensity of distributed light and a device for converting an amount of incident photons to a current to enable the current to be measured. The light receiving module 854 may include, for example, a photodiode and a pyroelectric detector.

A spectroscopic module 853 may distribute light generated in the light emitting module 855, i.e., the light source before the light reaches the light receiving module 854 through various paths to enable analysis of the light on a wavelength basis. For example, the spectroscopic module 853 may include a long pass filter, short pass filter, band pass filter, notch filter, diffraction grating device, Fabry-Perot Interferometer (FPI), linear variable filter (LVF), and digital light processor (DLP). Further, the spectroscopic module 853 may include a reflection plate and a lens for adjusting a path and shape of light. In the spectrometer module, the spectroscopic module 853 may be disposed on the light receiving module 854. In another embodiment, the spectroscopic module 853 may be disposed on the light emitting module 855 of the spectrometer. In another embodiment, when light generated in the light emitting module 855 is light of a short wavelength LED, the spectroscopic module 853 may not be disposed on the light receiving module 854 or the light emitting module 855.

The structure may further include an application specific integrated circuit (ASIC) 856

The ASIC 856 may include an LED driver IC for controlling the light emitting module 855, i.e., a light source; an oscilloscope for controlling a micro controller unit (MCU) (e.g., the processor 120 of FIG. 1) and the light receiving module; and an analog circuit chip set (e.g., an analog front-end (AFE)).

An outer wall 851a and an isolation wall 851b may be structures for preventing light generated in the light emitting module 855, i.e., a light source, from being directly introduced into the light receiving module 854. The outer wall 851a and the isolation wall 851b may reach light generated in the light source in a layer 852 coated with the standard reflective material and enable the light to enter the light receiving module 854 by reflection.

The liquid crystal layer 804 (e.g., twisted nematic liquid crystal (TN LC)) of the display panel layer may be positioned between the first glass 802 and the second glass 806, and the first glass 802 and the second glass 806 may fix liquid crystals in a liquid phase state of the liquid crystal layer 804. The first transparent electrode 803 and the second transparent electrode 805 may control alignment of the liquid crystals. The first transparent electrode 803 and the second transparent electrode 805 may be controlled to correspond to a drive circuit 860 under the control of the ASIC 856.

The display panel layer may have a structure in which the reflective polarizing plate 801 is provided at the upper end of the first glass 802 and in which the polarizing plate 807 is provided at the lower end of the second glass 806. The polarizing plate 807 may be positioned at a position adjacent to the reflection module.

A standard reflective material 852 of the reflection module may be applied to one surface (e.g., a surface facing the reflective polarizing plate 801) of one (e.g., the isolation wall 851b) of the outer wall 851a and the isolation wall 851b. In another embodiment, a layer coated with the standard reflective material 852 may be disposed on one surface (surface facing the reflective polarizing plate 801) of one (e.g., the isolation wall 851b) of the outer wall 851a and the isolation wall 851b of the spectrometer module.

According to various embodiments of the present invention, the electronic device may correct a spectrometer or may obtain reflection data of a target material according to a voltage applied to the liquid crystal layer 804. A description of the voltage applied to the liquid crystal layer 804 will be described with reference to FIGS. 8B and 8C.

Before describing with reference to FIG. 8B, according to properties of the liquid crystal layer, the polarizing plate, and the reflective polarizing plate, when the electronic device corrects a spectrometer, a voltage may be applied to the liquid crystal layer or may not be applied to the liquid crystal layer. In FIG. 8B, in an embodiment, a case will be described in which a voltage is not applied to the liquid crystal layer in order to change a polarization property of passing light.

With reference to FIG. 8B, when the electronic device corrects the spectrometer, the ASIC 856 may control the drive circuit 860 not to apply a voltage to the liquid crystal layer 804. In an embodiment, when no voltage is applied, the liquid crystal layer 804 may change a polarization property of passing light.

Light generated in the light emitting module 855 may have vertical polarization and horizontal polarization. The light may pass through the polarizing plate 807 that passes through only vertical polarization to be vertical polarized light (or left-handed circularly polarized light). The light vertically polarized by passing through the polarizing plate 807 may pass through the liquid crystal layer 804 to which power is not applied and be horizontal polarized light (or right-handed circularly polarized light). Horizontal polarized light (or right-handed circularly polarized light) by passing through the liquid crystal layer 804 may be reflected by the reflective polarizing plate 801 to pass through only vertical polarized light. The reflected light may pass through the liquid crystal layer 804 to which power is not applied, and a polarization property of the light is changed to be vertically polarized (or left-handed circularly polarized), and the light may pass through the polarizing plate 807 to pass through only vertical polarized light and reach the light receiving module 854.

According to the same principle, with reference to FIG. 8A, light generated in the light emitting module 855 may reach the reflective polarizing plate 801 through the polarizing plate 807 and the liquid crystal layer 804. Light reflected from the reflective polarizing plate 801 may reach the standard reflective material 852 applied on the isolation wall 851b. Light reflected after reaching the standard reflective material 852 may sequentially pass through the polarizing plate 807 and the liquid crystal layer 804 to reach the reflective polarizing plate 801. The light reaching the reflective polarizing plate 801 may be reflected from the reflective polarizing plate 801 based on the above principle and sequentially pass through the liquid crystal layer 804 and the polarizing plate 807 to reach the light receiving module 854.

According to various embodiments of the present invention, light sequentially passing through the liquid crystal layer 804 and the polarizing plate 807 with reflection by reaching the reflective polarizing plate 801 may first reach the spectroscopic module 853 before reaching the light receiving module 854.

The spectroscopic module 853 may distribute the light to enable analysis of the light on a wavelength basis, and the light receiving module 854 may obtain reflection data of the standard reflective material 852. The obtained reflection data may be reference white.

With reference to FIG. 8C, when the electronic device measures reflection data of a target material based on the spectrometer, the ASIC 856 may control the drive circuit 860 to apply a voltage to the liquid crystal layer 804. In an embodiment, when a voltage is applied, the liquid crystal layer 804 may not change a polarization property of passing light.

Light generated in the light emitting module 855 may have vertical polarization and horizontal polarization. Because light passes through a polarizing plate 807 that passes through only vertical polarization, the light may be vertically polarized (or left-handed circularly polarized). The light vertically polarized by passing through the polarizing plate 807 may pass through the liquid crystal layer 804 to which power is applied and maintain a vertically polarized state (left-handed circularly polarized state). The light may pass through the reflective polarizing plate 801 to pass through only vertical polarization. The passed light may reach a target material 890, and light reflected from the target material 890 may sequentially pass through the reflective polarizing plate 801, the liquid crystal layer 804, and the polarizing plate 807 and reach the light receiving module 854.

According to the same principle, with reference to FIG. 8A, light generated in the light emitting module 855 may reach the reflective polarizing plate 801 through the polarizing plate 807 and the liquid crystal layer 804. The light passed through the reflective polarizing plate 801 may reach the target material 890, and light reflected from the target material 890 may again reach the light receiving module 854 sequentially through the reflective polarizing plate 801, the liquid crystal layer 804, and the polarizing plate 807.

According to various embodiments of the present invention, light passed through the polarizing plate 807 may reach first the spectroscopic module 853 before reaching the light receiving module 854. The spectroscopic module 853 may distribute the light to enable analysis of the light on a wavelength basis, and the light receiving module 854 may obtain reflection data of the target material 890.

According to various embodiments of the present invention, an electronic device includes a light emitting module configured to emit light; a reflection module configured to reflect light emitted from the light emitting module; a spectroscopic module; and a light receiving module configured to receive at least one wavelength band of a plurality of wavelength bands distributed by the spectroscopic module.

The spectroscopic module according to various embodiments of the present invention may be positioned at the upper end of the light emitting module and distribute light emitted from the light emitting module into a plurality of wavelength bands.

The spectroscopic module according to various embodiments of the present invention may be positioned at the upper end of the light receiving module and distribute light reflected from the reflection module into a plurality of wavelength bands.

The light emitting module, the reflection module, the spectroscopic module, and the light receiving module according to various embodiments of the present invention may be constituent elements of a spectrometer.

The reflection module according to various embodiments of the present invention may include at least a portion of an isolation wall formed between the light emitting module and the light receiving module.

The electronic device according to various embodiments of the present invention may include a reflective material layer formed in at least a partial area of an upper portion of the isolation wall.

According to various embodiments of the present invention, an electrochromic glass layer formed at the upper end of the reflection module and that forms at least a portion of one surface of the electronic device may be formed.

The electronic device according to various embodiments of the present invention may include a display panel layer formed at the upper end of the reflection module.

The electronic device according to various embodiments of the present invention may include a processor, wherein the processor may be configured to adjust a color or transparency of at least a partial area of the display panel layer corresponding to the light emitting module or the light receiving module.

The reflection module according to various embodiments of the present invention may include at least a portion of an opening and closing portion configured to open and close the light emitting module or the light receiving module with respect to the outside.

A reflective material layer may be formed in at least a partial area of the opening and closing portion facing the light emitting module according to various embodiments of the present invention.

The reflection module according to various embodiments of the present invention may include at least a portion of one surface of the housing of the electronic device.

Figure 9:
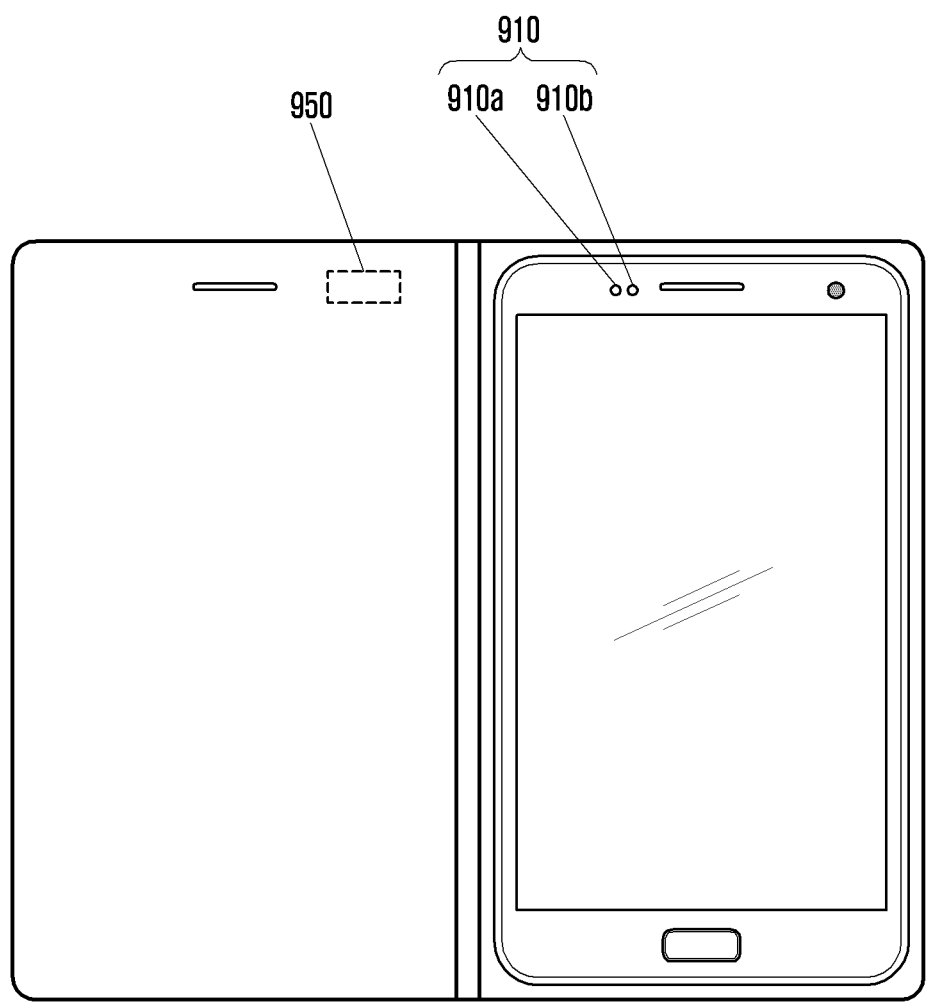
FIG. 9 is a diagram illustrating correction of a spectrometer of an electronic device according to various embodiments.

FIG. 9 is a diagram illustrating correction of a spectrometer of an electronic device according to various embodiments.

With reference to FIG. 9, an electronic device may be normally coupled to an accessory, and the accessory of FIG. 9 may include a cover. At a position contacting with the spectrometer including a light emitting module 910a and a light receiving module 910b exposed to a portion of the housing of the electronic device at one surface of a cover facing a front surface of the electronic device, a standard reflective material 950 may be included. The electronic device may include a magnetic object (e.g., a magnet).

According to various embodiments of the present invention, the electronic device may include a Hall sensor capable of detecting a magnetic field to detect an operation in which a user covers a front surface of the electronic device with a cover including a magnetized object by the change of a measured value of the Hall sensor. When a detection is made by the electronic device, the electronic device may correct a light source using a standard reflective material 950 included in the cover. For example, the electronic device may designate reflection data of the standard reflective material to reference white.

Figure 10:
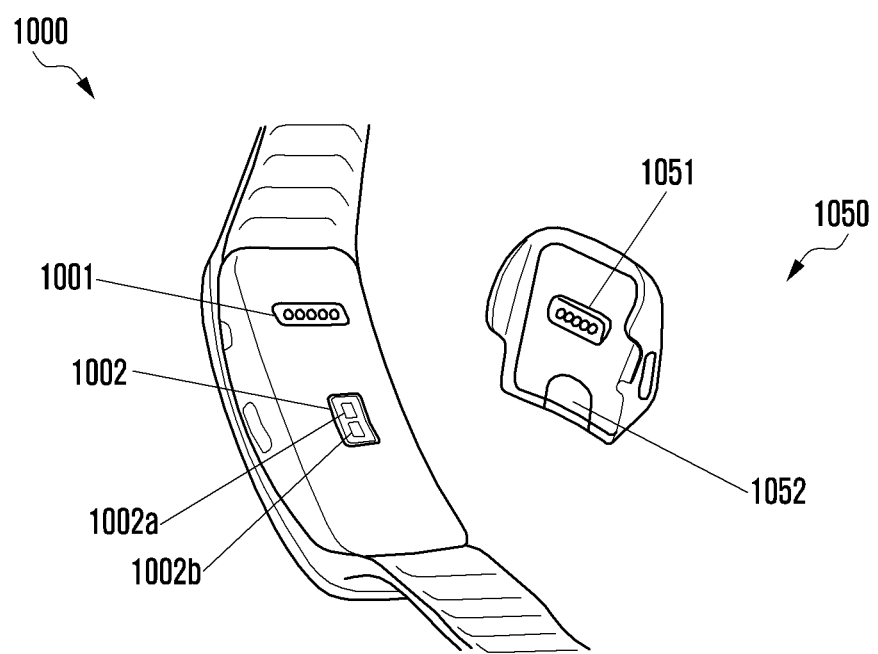
FIG. 10 is a diagram illustrating correction of a spectrometer of an electronic device according to various embodiments.

FIG. 10 is a diagram illustrating correction of a spectrometer of an electronic device according to various embodiments.

With reference to FIG. 10, an electronic device 1000 may be a wearable device (e.g., a smart watch, a smart band). At one surface (e.g., a surface coming in contact with a charging dock 1050) of the electronic device 1000, a spectrometer 1002 may be provided. At one surface (e.g., a surface coming in contact with the electronic device 1000) of the charging dock 1050 of the electronic device 1000, a standard reflective material 1052 may be coated. When the electronic device 1000 is mounted in the charging dock 1050, the electronic device 1000 may perform correction of a light source. When the electronic device 1000 is mounted in the charging dock 1050, light emitted from a light emitting module 1002a of the spectrometer 1002 of the electronic device 1000 may reach the standard reflective material 1052 of the charging dock 1050, and light reflected from the standard reflective material 1052 may be received by a light receiving module 1002b of the spectrometer 1002 of the electronic device 1000. The light receiving module may correct the light source based on the received light. For example, reflection data of the standard reflective material may be designated to reference white.

The electronic device 1000 may detect through impedance of the charging terminal 1001 and the charging terminal 1051 of the charging dock 1050 that the electronic device 1000 was mounted in the charging dock 1050. In an embodiment, when a magnetic object is provided in the electronic device 1000 and when a Hall sensor is provided in the charging dock 1050, the electronic device 1000 may determine with a change in a measured value of the Hall sensor that the electronic device 1000 was mounted on the charging dock 1050.

An electronic device according to various embodiments of the present invention includes a processor; a light emitting module configured to emit light according to the control of the processor; a spectroscopic module; and a light receiving module configured to receive at least one wavelength band of a plurality of wavelength bands distributed by the spectroscopic module, wherein the processor is configured to detect a contact with an external device including the reflection module, to control the light emitting module to emit light to the reflection module of the external device, and to correct a spectrometer based on at least one wavelength band of a plurality of wavelength bands reflected from the reflection module and distributed by the spectroscopic module.

According to various embodiments of the present invention, the spectrometer may be corrected by adjusting a voltage or a current of a light source of the light emitting module.

According to various embodiments of the present invention, the external device may include one of a cover and a charging dock.

According to various embodiments of the present invention, in the cover, the reflection module may be included in a portion opposite to at least one of the light emitting module and the light receiving module of the electronic device at one surface of the cover.

According to various embodiments of the present invention, in the charging dock, the reflection module may be included in a portion opposite to at least one of the light emitting module and the light receiving module of the electronic device at one surface of the charging dock.

Figure 11:
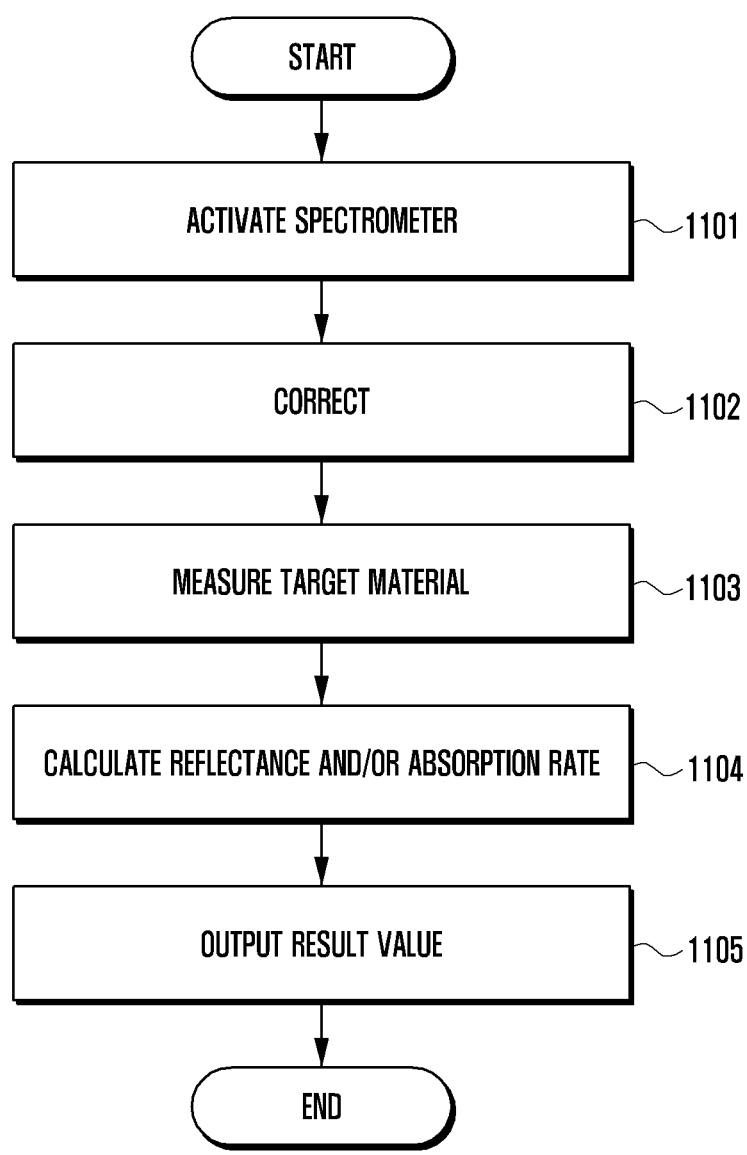
FIG. 11 is a flowchart illustrating correction of a spectrometer of an electronic device according to various embodiments.

FIG. 11 is a flowchart illustrating correction of a spectrometer of an electronic device according to various embodiments.

With reference to FIG. 11, in operation 1101, the electronic device may activate a spectrometer. The spectrometer may respond to a user's spectrometer activation request or may be activated when executing a specific application. Alternatively, the spectrometer may be activated every predetermined period.

In operation 1102, the electronic device may correct a light source using the activated spectrometer. A light source correction operation using the spectrometer may be performed by a user's request; and, when a predetermined condition is achieved, the electronic device may correct a light source. The present invention discloses various methods in an operation of correcting a light source. This operation will be described with reference to FIGS. 8A to 11.

In operation 1103, the electronic device may measure a target material through a corrected light source.

In operation 1104, the electronic device may calculate a reflectance and/or an absorption rate of the target material measured in operation 1103. In operation 1105, the electronic device may calculate a reflectance and/or an absorption rate of the target material through an internal analysis algorithm to output a result value.

Figure 12A:
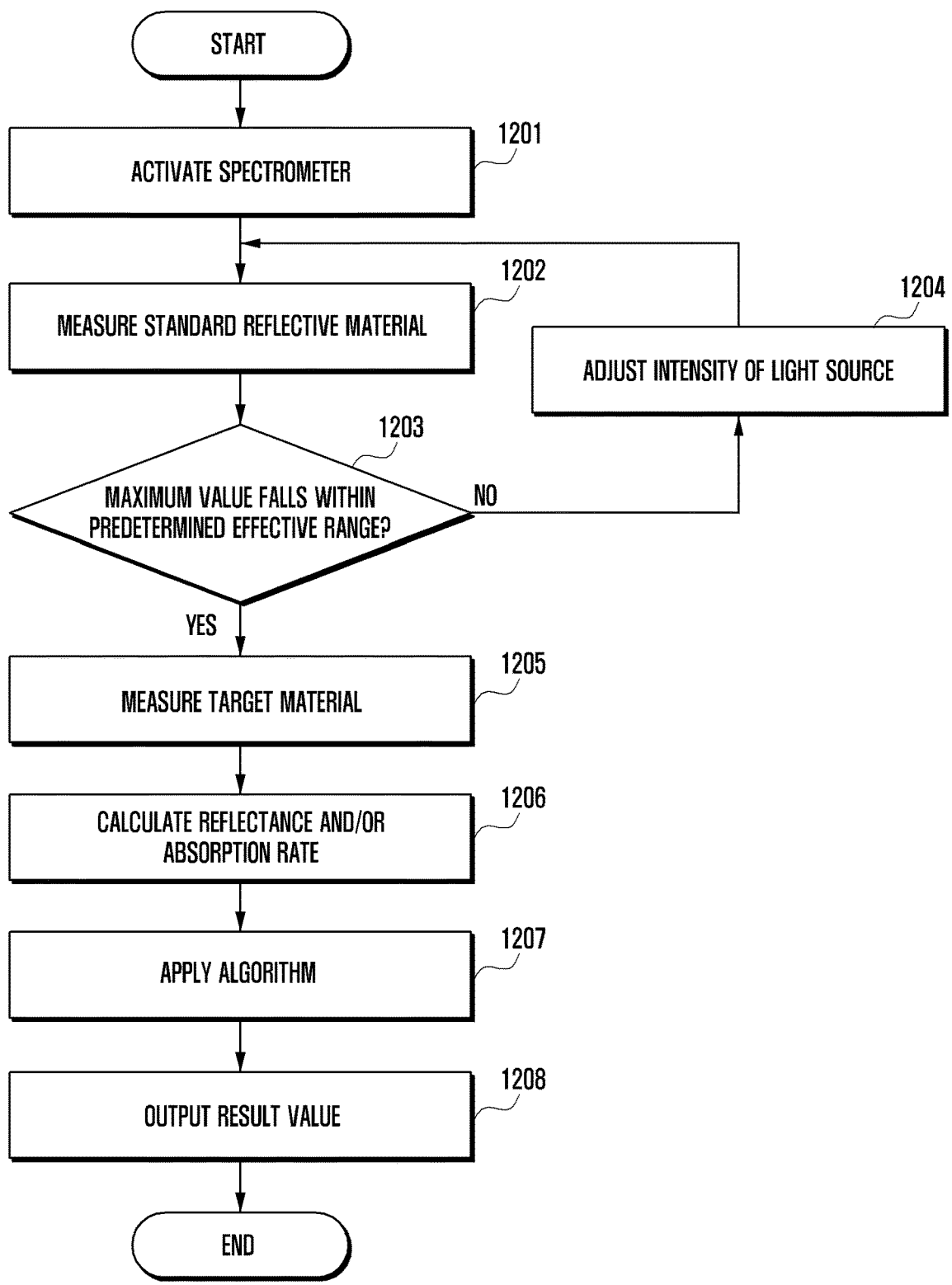
FIGS. 12A and 12B are flowcharts illustrating a method of correcting a spectrometer of an electronic device according to various embodiments.
Figure 12B:
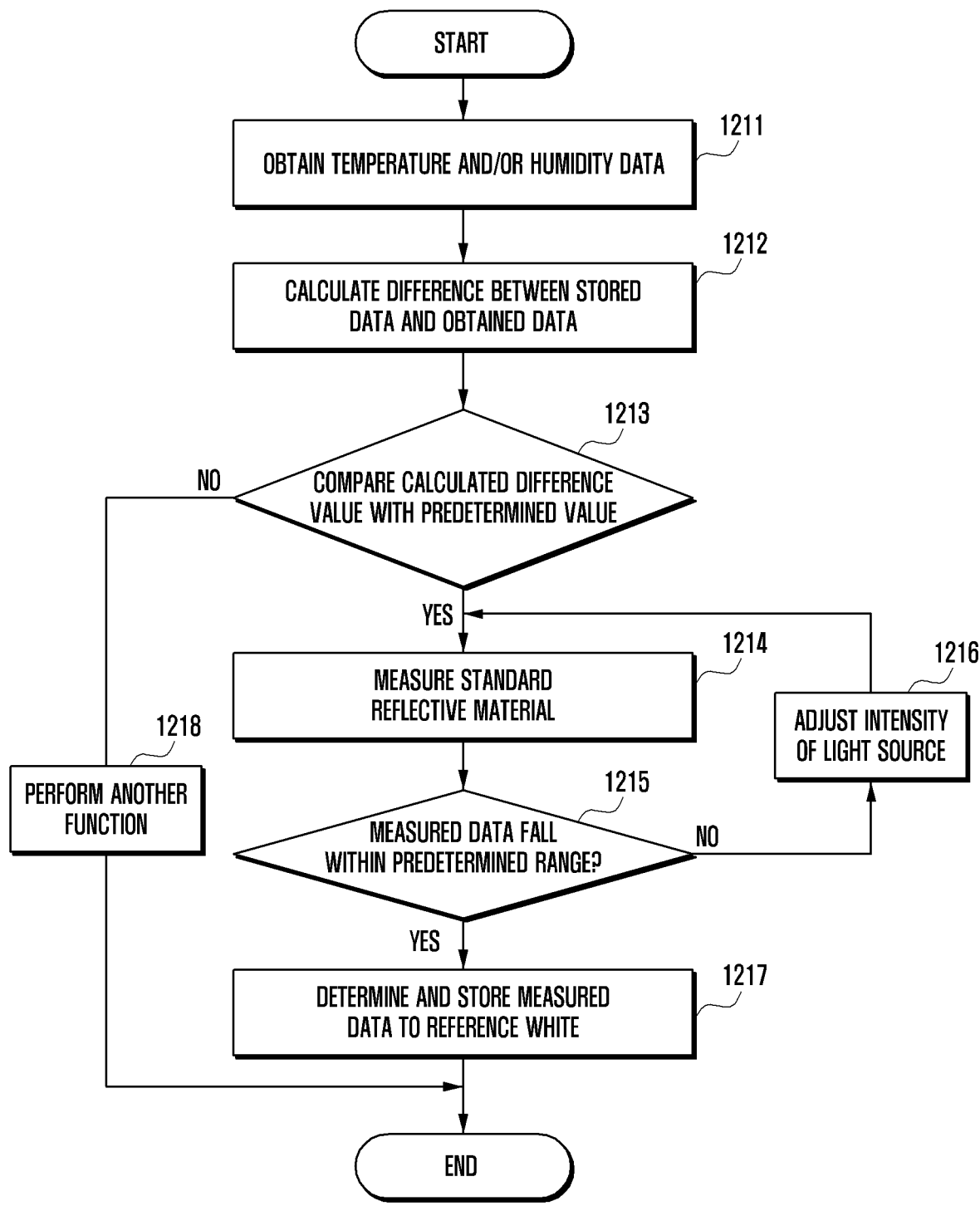

FIGS. 12A and 12B are flowcharts illustrating a method of correcting a spectrometer of an electronic device according to various embodiments.

FIGS. 12A and 12B may be flowcharts related to operation 1102 of FIG. 11 described above.

A description is provided later with reference to FIG. 12A. In correcting a spectrometer, the electronic device may correct the spectrometer each time that the target material is measured and correct the spectrometer every specific period.

In operation 1201, the electronic device may activate the spectrometer. The spectrometer may be activated in response to a user's spectrometer activation request. The spectrometer may be activated every predetermined period.

In operation 1202, the electronic device may position a standard reflective material in front of the light emitting unit and/or the light receiving unit and measure a value in which light output from the light emitting unit is reflected from the standard reflective material and is absorbed into the light receiving unit. The electronic device may convert the measured analog data to digital data through an analog-to-digital conveyor (ADC).

In operation 1203, the electronic device may determine whether a maximum value of the converted digital data falls within a predetermined effective range. In an embodiment, the predetermined effective range may include, for example, a range of 30,000±5%.

If a maximum value of the converted digital data does not fall within a predetermined effective range, in operation 1204, the electronic device may adjust a voltage (or a current) of the light source to enable the light emitting unit to output light. The electronic device may again measure a value in which light output from the light emitting unit is reflected from the standard reflective material to be absorbed into the light receiving unit.

If a maximum value of the converted digital data falls within a predetermined effective range, the electronic device may determine and store the data measured in operation 1202 to reference data, for example, reference white.

In operations 1205 to 1208, the electronic device may remove a standard reflective material positioned at a front surface of the light emitting unit and/or the light receiving unit and obtain a reflectance or an absorption rate of light for a target material to measure for applying an algorithm thereto, thereby outputting a result value.

With reference to FIG. 12B, in operation 1211, the electronic device may measure and obtain a temperature and/or humidity through a sensor module (e.g., the sensor module 240 of FIG. 2) therein. A light source of the electronic device may be influenced by a temperature, humidity, frequency of use, and the like.

In operation 1212, the electronic device may calculate a difference between obtained data and data stored in the electronic device. The stored data may be, for example, data when the electronic device measures a temperature and/or humidity at a time point in which the electronic device measures a target material and may be updated data when the electronic device measures a temperature and/or humidity according to a predetermined period.

In operation 1213, the electronic device may compare magnitudes between the calculated difference value and a predetermined value.

If the calculated difference value is greater than a predetermined value, in operation 1214, the electronic device may position a standard reflective material at a front surface of the light emitting unit and/or the light receiving unit and measure a value in which light output from the light emitting unit is reflected by the standard reflective material to be absorbed into the light receiving unit. The electronic device may convert the measured analog data to digital data through an analog-to-digital converter (ADC).

In operation 1215, the electronic device may determine whether a maximum value of the converted digital data falls within a predetermined range. For example, the predetermined range may include a predetermined effective range (e.g., a range of 30,000±5%).

If a maximum value of the converted digital data does not fall within a predetermined range, in operation 1216, the electronic device may adjust an intensity of the light source. For example, the electronic device may adjust a voltage (or a current) of the light source to output light from the light emitting unit. The electronic device may again measure a value in which light output from the light emitting unit is reflected by the standard reflective material to be absorbed into the light receiving unit.

If a maximum value of the converted digital data falls within a predetermined range, in operation 1217, the electronic device may determine and store the data measured in operation 1214 to reference data, for example, reference white.

If the calculated difference value is smaller than a predetermined value, in operation 1218, the electronic device may perform another function based on the obtained temperature and/or humidity data.

According to various embodiments of the present invention, a method of controlling a spectrometer include operations of detecting a contact with an external device including a reflection module; emitting light to the reflection module of the external device through a light emitting module of the electronic device; distributing light reflected from the reflection module into a plurality of wavelength bands; receiving at least one band of the plurality of distributed wavelength bands; and correcting a spectrometer based on the at least one received band.

According to various embodiments of the present invention, operation of detecting a contact with an external device may include operation of detecting a change in a value measured from a sensor capable of measuring magnetism, when the external device includes a magnetized object.

According to various embodiments of the present invention, the correcting operation may include operation of adjusting a voltage or a current of a light source of the light emitting module.

Figure 13:
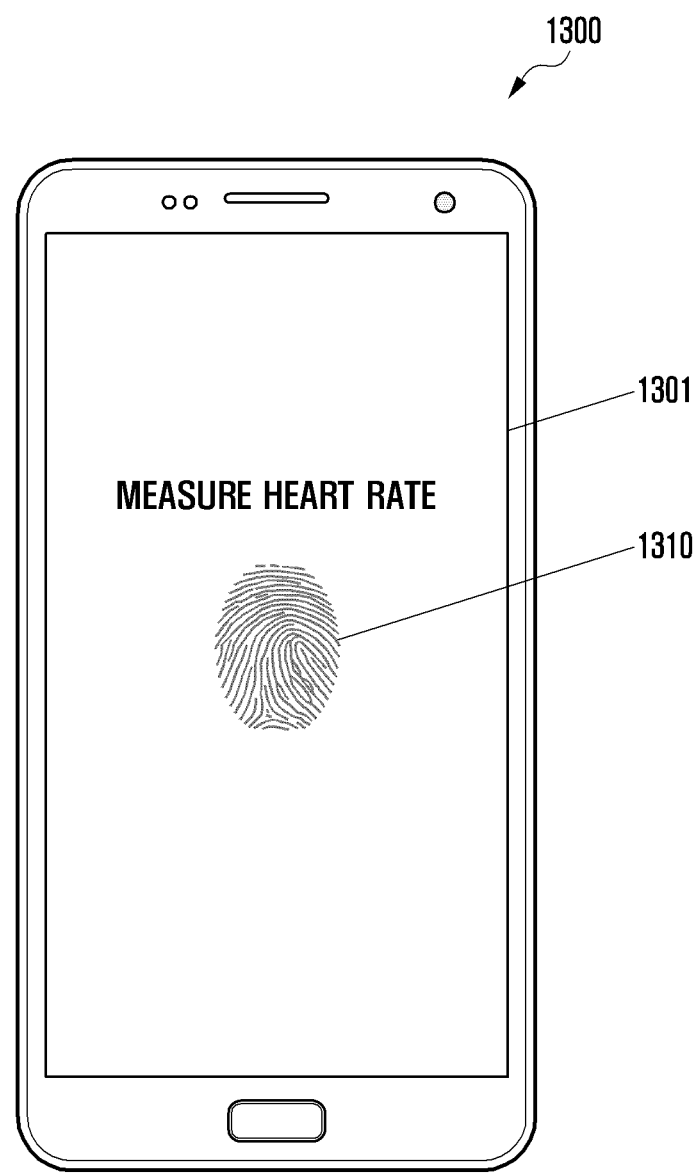
FIG. 13 is a diagram illustrating an electronic device according to various embodiments.

FIG. 13 is a diagram illustrating an electronic device according to various embodiments.

With reference to FIG. 13, an electronic device 1300 may include a structure for correcting the spectrometer of FIG. 8A. When a user's request to measure a target material is received, the electronic device 1300 may activate a spectrometer. The electronic device 1300 in which the spectrometer is activated may display an image 1310 that may guide the user to position the target material at a near position of a display 1301, in at least a portion of the display 1301. In an embodiment, the target material may be a portion of a user's body (e.g., a finger), and the user may touch a portion of the body on the image 1310 displayed on the display 1301 for a few seconds.

In the electronic device 1300, light emitted from the light emitting module may reach a portion of the user's body, and the light receiving module may receive light reflected from a portion of the user's body. The light receiving module may obtain reflection data of a portion of the user's body through the received light.

In an embodiment, the reflection data obtained by the light receiving module of the electronic device 1300 may be different according to a blood flow amount of a portion of the user's body. The electronic device 1300 may measure a heart rate of the user based on reflection data obtained differently according to a change in a blood flow amount.

Although a method of controlling a spectrometer and an electronic device supporting the same according to embodiments of the present invention have been described in detail hereinabove, it should be clearly understood that many variations and modifications of the basic inventive concepts herein described which may appear to those skilled in the art will still fall within the spirit and scope of the embodiments of the present invention as defined in the appended claims. That is, it is apparent to those skilled in the art that various embodiments are available based on the technical idea of the present invention.

The invention claimed is:

1. An electronic device, comprising:
   a light emitter configured to emit light;
   a layer coated with reflective material configured to reflect light emitted from the light emitter;
   a spectroscopic module; and
   a light detector configured to receive at least one wavelength band of a plurality of wavelength bands distributed by the spectroscopic module,
   wherein the light emitter, the layer coated with reflective material, the spectroscopic module, and the light detector are constituent elements of a spectrometer.

2. The electronic device of claim 1, wherein the spectroscopic module is positioned at an upper end of the light emitter and distributes light emitted from the light emitter into the plurality of wavelength bands or is positioned at the upper end of the light detector and distributes light reflected from the layer coated with reflective material into the plurality of wavelength bands.

3. The electronic device of claim 1, wherein the layer coated with reflective material comprises at least a portion of an isolation wall formed between the light emitter and the light detector.

4. The electronic device of claim 3, further comprising a display panel layer formed at an upper end of the layer coated with reflective material.

5. The electronic device of claim 4, further comprising a processor,
   wherein the processor is configured to adjust a color or transparency of at least a partial area of the display panel layer corresponding to the light emitter or the light detector.

6. The electronic device of claim 1, wherein the layer coated with reflective material comprises at least a portion of an opening and closing portion configured to open and close the light emitter or the light detector with respect to the outside.

7. The electronic device of claim 6, wherein a reflective material layer is formed in at least a partial area of the opening and closing portion facing the light emitter.

8. The electronic device of claim 6, wherein the layer coated with reflective material comprises at least a portion of one surface of a housing of the electronic device.

9. An electronic device comprising:
   a processor;
   a light emitter configured to emit light according to the control of the processor;
   a spectroscopic module; and
   a light detector configured to receive at least one wavelength band of a plurality of wavelength bands distributed by the spectroscopic module,
   wherein the processor is configured to detect a contact with an external device comprising a layer coated with reflective material, to control the light emitter to emit light to the layer coated with reflective material of the external device, to correct a spectrometer based on at least one wavelength band of the plurality of wavelength bands reflected from the layer coated with reflective material and distributed by the spectroscopic module, and to calculate a reflectance or an absorption rate of the layer coated with reflective material of the external device using the spectrometer.

10. The electronic device of claim 9, wherein the spectrometer is corrected by adjusting a voltage or a current of a light source of the light emitter.

11. The electronic device of claim 9, wherein the external device comprises a cover,
    wherein in the cover, the layer coated with reflective material is included in a portion opposite to at least one of the light emitter and the light detector of the electronic device at one surface of the cover.

12. The electronic device of claim 9, wherein the external device comprises a charging dock,
    wherein in the charging dock, the layer coated with reflective material is included in a portion opposite to at least one of the light emitter and the light detector of the electronic device at one surface of the charging dock.

13. A method of controlling a spectrometer, the method comprising:
    detecting a contact with an external device comprising a layer coated with reflective material;
    emitting light to the layer coated with reflective material of the external device through a light emitter of the spectrometer;
    distributing light reflected from the layer coated with reflective material into a plurality of wavelength bands;
    receiving at least one band of the plurality of distributed wavelength bands;
    correcting the spectrometer based on the received band; and
    calculating a reflectance or an absorption rate of the layer coated with reflective material of the external device using the spectrometer.

14. The method of claim 13, wherein detecting contact with the external device comprises detecting contact with the external device comprising a magnetized object by detecting a change in a value measured from a sensor capable of measuring magnetism of the spectrometer.

* * * * *